(12) United States Patent
Nakagawa et al.

(10) Patent No.: US 11,635,395 B2
(45) Date of Patent: Apr. 25, 2023

(54) MIXTURE RATIO CALCULATION DEVICE

(71) Applicant: OMRON Corporation, Kyoto (JP)

(72) Inventors: Shinya Nakagawa, Omihachiman (JP); Susumu Kamiyama, Ritto (JP); Hajime Kano, Kusatsu (JP); Hideyuki Nakao, Kusatsu (JP); Kenichi Handa, Takatsuki (JP)

(73) Assignee: OMRON Corporation, Kyoto (JP)

( * ) Notice: Subject to any disclaimer, the term of this patent is extended or adjusted under 35 U.S.C. 154(b) by 413 days.

(21) Appl. No.: 16/999,553

(22) Filed: Aug. 21, 2020

(65) Prior Publication Data

US 2021/0055239 A1    Feb. 25, 2021

(30) Foreign Application Priority Data

Aug. 22, 2019  (JP) .............................. JP2019-152361
Jul. 3, 2020  (JP) .............................. JP2020-115607

(51) Int. Cl.
*G01N 25/18*  (2006.01)
*G01N 29/024*  (2006.01)

(52) U.S. Cl.
CPC ........... *G01N 25/18* (2013.01); *G01N 29/024* (2013.01); *G01N 2291/011* (2013.01); *G01N 2291/0224* (2013.01)

(58) Field of Classification Search
CPC .................. G01N 25/18; G01N 29/024; G01N 2291/0224
USPC .......................................................... 374/44
See application file for complete search history.

(56) References Cited

U.S. PATENT DOCUMENTS

2022/0196602 A1\*  6/2022  Xu, Jr ................ G01N 33/0027

FOREIGN PATENT DOCUMENTS

| CN | 105593671 A | \* | 5/2016 | ............. G01N 25/18 |
| DE | 4436813 A1 | \* | 4/1996 | ........... G01N 29/036 |
| DE | 102013100307 A1 | \* | 7/2014 | ............. G01N 25/18 |
| JP | 2006-275608 A | | 10/2006 | |
| JP | 2017-90317 A | | 5/2017 | |
| JP | 2020139873 A | \* | 9/2020 | |
| WO | WO-2007037209 A1 | \* | 4/2007 | ............. G01N 25/18 |

\* cited by examiner

*Primary Examiner* — Mirellys Jagan
(74) *Attorney, Agent, or Firm* — Metrolex IP Law Group, PLLC

(57) ABSTRACT

A first heat generator heats a mixture of fluids to a first temperature. A predetermined thermal property value of the mixture set to the first temperature is obtained, the first heat generator heats the mixture to a second temperature, the thermal property value of the mixture set to the second temperature is obtained. First relationship information between the thermal property value of the mixture set to the first temperature and a mixture ratio of a first fluid is obtained. Second relationship information between the thermal property value of the mixture set to the second temperature and the mixture ratio of the first fluid is obtained. Mixture ratios are calculated based on the thermal property value of the mixture set to the first temperature, the thermal property value of the mixture of fluids set to the second temperature, the first relationship information, and the second relationship information.

20 Claims, 18 Drawing Sheets

FIG. 22A --Background Art--
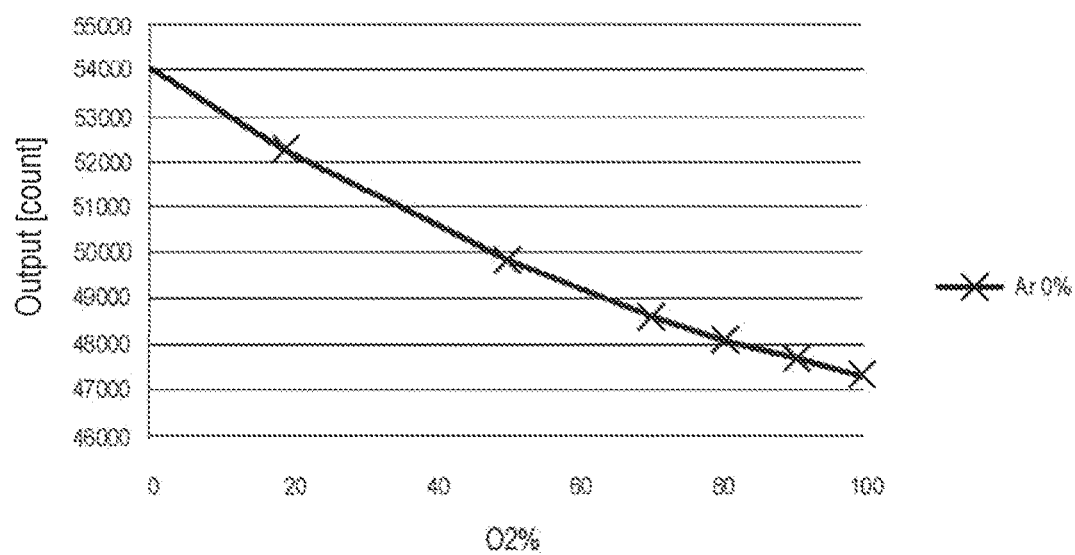
FIG. 22B --Background Art--
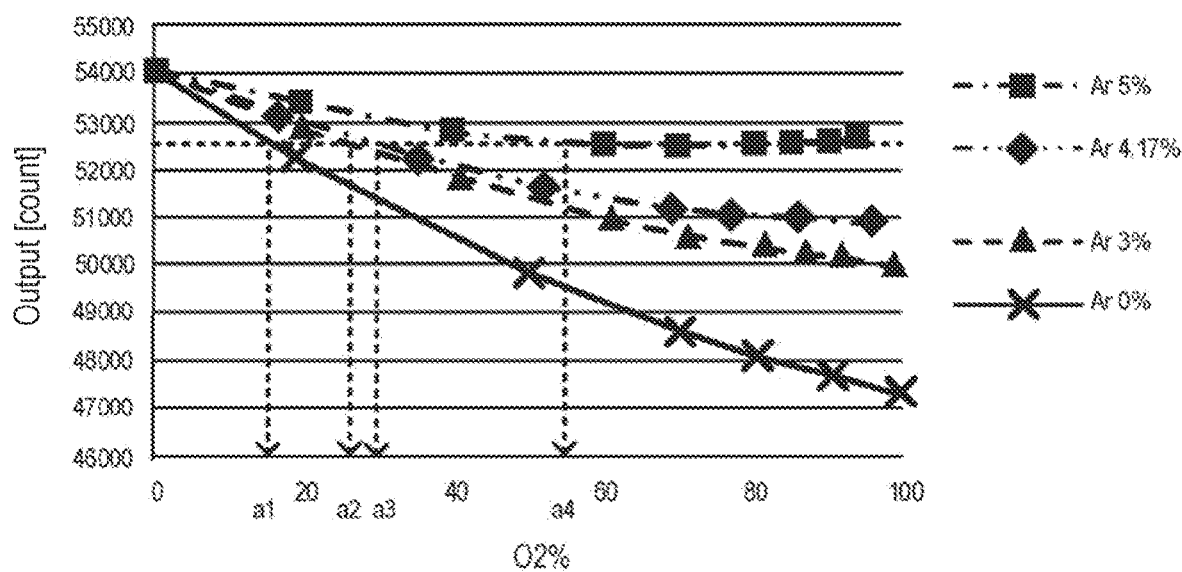

MIXTURE RATIO CALCULATION DEVICE

CROSS-REFERENCE TO RELATED APPLICATION

This application is based on Japanese Patent Application No. 2019-152361 filed with the Japan Patent Office on Aug. 22, 2019 and on Japanese Patent Application No. 2020-115607 filed with the Japan Patent Office on Jul. 3, 2020, the entire contents of each of which are incorporated herein by reference.

FIELD

The present disclosure relates to a mixture ratio calculation device.

BACKGROUND

Devices capable of specifying a component ratio of a specific component to a mixture of fluids containing two or more components have been proposed (for example, refer to JP 2017-090317 A and JP 2006-275608 A).

However, all of such devices are designed to handle a mixture of two kinds of gases.

For example, for a mixture of two kinds of gases having different thermal properties such as a mixture of oxygen and nitrogen (0% argon) shown in FIG. 22A, thermal conductivity of the mixture of gases is uniquely determined on the basis of oxygen concentration. Therefore, detecting the thermal conductivity, which is a type of thermal property, using a thermal type sensor allows the oxygen concentration to be specified from an output from the sensor on a one-to-one basis.

However, as shown in FIG. 22B, for a mixture of gases containing three components including not only oxygen and nitrogen but also argon whose concentration is unknown, even when the thermal conductivity of the mixture of gases is detected by the sensor, the oxygen concentration corresponding to the same output from the sensor is not uniquely determined because the oxygen concentration also depends on the argon concentration. FIG. 22B is a graph showing a relationship between each component of a mixture of gases containing oxygen, nitrogen, and argon and the output from the sensor for detecting the thermal conductivity, with the horizontal axis representing the oxygen concentration and the vertical axis representing the sensor output. Here, a line that has plotted values represented by X-shaped marks and is represented by a solid line represents a case where 0% argon is contained (that is, the mixture of gases contains only oxygen and nitrogen). A line that has plotted values represented by triangular marks and is represented by a dashed line represents a case where 3% argon is contained. Further, a line that has plotted values represented by diamond-shaped marks and is represented by a long dashed double-short dashed line represents a case where 4.17% argon is contained, and a line that has plotted values represented by squares and is represented by a long dashed short dashed line represents a case where 5% argon is contained. In FIG. 22B, when outputs from the sensor as represented by dashed lines are obtained, a value on the abscissa of an intersection of a curve showing a relationship with the oxygen concentration and a corresponding one of the dashed lines, that is, the oxygen concentration, varies in a manner that depends on the argon concentration. In this example, the oxygen concentration corresponding to the output from the sensor can take four values of a1, a2, a3, and a4 in accordance with the argon concentration, preventing the oxygen concentration from being uniquely determined.

SUMMARY

The disclosed and recited embodiments of the invention have been made in view of the above-described problems, and it is therefore an object to provide a technique capable of calculating a component ratio of a mixture of fluids containing three or more kinds of components.

According to one or more disclosed and recited embodiments for solving the above-described problems, a mixture ratio calculation device configured is provided to calculate a mixture ratio of a mixture of fluids containing three or more kinds of fluids. Accordingly, a mixture ratio calculation device may include a first heat generator configured to heat the mixture of fluids, a basic information detector configured to detect basic information on a predetermined thermal property value of the mixture of fluids, and a mixture ratio calculator configured to calculate mixture ratios of the three or more kinds of fluids to the mixture of fluids. A mixture ratio calculator may be configured to cause the first heat generator to set the mixture of fluids to a first temperature, obtain the predetermined thermal property value of the mixture of fluids at the first temperature on the basis of a detection result for the mixture of fluids set to the first temperature from the basic information detector, cause the first heat generator to set the mixture of fluids to a second temperature different from the first temperature, obtain the thermal property value of the mixture of fluids set to the second temperature on the basis of a detection result for the mixture of fluids set to the second temperature from the basic information detector, obtain first relationship information that defines a relationship between the thermal property value of the mixture of fluids set to the first temperature and a mixture ratio, to the mixture of fluids, of a first fluid contained in the mixture of fluids, obtain second relationship information that defines a relationship between the thermal property value of the mixture of fluids set to the second temperature and a mixture ratio of the first fluid to the mixture of fluids, and calculate the mixture ratios of the three or more kinds of fluids to the mixture of fluids on the basis of the thermal property value of the mixture of fluids set to the first temperature, the thermal property value of the mixture of fluids set to the second temperature, the first relationship information, and the second relationship information.

Even when the relationship between the thermal property value of the mixture of fluids and the mixture ratio of the first fluid contained in the mixture of fluids at a certain temperature is known, this relationship itself varies in a manner that depends on the mixture ratio of another fluid contained in the mixture of fluids; therefore, even when the thermal property value of the mixture of fluids is obtained, it fails to calculate the mixture ratio of the mixture of fluids. However, provided that the relationship between the thermal property value of the mixture of fluids and the mixture ratio of the first fluid at two different temperatures is known, since the mixture ratio of the first fluid at both of the two temperatures is constant, when the thermal property values of the mixture of fluids set to the two temperatures are obtained, a relationship corresponding to any mixture ratio of the other fluids can be specified under the condition where each thermal property value corresponds to the constant mixture ratio of the first fluid. Therefore, the mixture ratio of the first fluid and the mixture ratio of another fluid satisfying such a condition are specified, and the mixture ratio (component ratio) of the mixture of fluids including of the three or more kinds of components including the last remaining kind of fluid can be calculated.

According to one or more aspects, the first heat generator configured to heat the mixture of fluids sets the mixture of fluids to a first temperature and a second temperature different from the first temperature. Then, as a structure for obtaining the predetermined thermal property value of the mixture of fluids, the basic information detector configured to detect the basic information on the predetermined thermal property value of the mixture of fluids, and the mixture ratio calculator are provided. Here, the mixture ratio calculator causes the first heat generator to set the mixture of fluids to the first temperature, and obtains the thermal property value of the mixture of fluids set to the first temperature on the basis of the detection result for the mixture of fluids set to the first temperature from the basic information detector. Further, the mixture ratio calculator causes the first heat generator to set the mixture of fluids to the second temperature, and obtains the thermal property value of the mixture of fluids set to the second temperature on the basis of the detection result for the mixture of fluids set to the second temperature from the basic information detector. The mixture ratio calculator obtains in advance the first relationship information that defines the relationship between the thermal property value of the mixture of fluids set to the first temperature and the mixture ratio, to the mixture of fluids, of the first fluid contained in the mixture of fluids, and the second relationship information that defines the relationship between the thermal property value of the mixture of fluids set to the second temperature and the mixture ratio of the first fluid to the mixture of fluids. Then, the mixture ratio calculator calculates, on the above-described principle, the mixture ratios of the three or more kinds of fluids including the first fluid inf the mixture of fluids on the basis of the thermal property value of the mixture of fluids set to the first temperature, the thermal property value of the mixture of fluids set to the second temperature, the first relationship information, and the second relationship information. Here, the predetermined thermal property value is a property value of fluid that varies in a manner that depends on heat (temperature). Further, the basic information is information that can be detected by the basic information detector and serves as a base for the thermal property value on which the predetermined thermal property value of can be obtained through a predetermined process on the detection result from the basic information detector using a predetermined calculation expression or a predetermined conversion table. Further, the basic information detected by the basic information detector may be used as the thermal property value.

According to one or more aspects, the mixture of fluids may contain three kinds of the fluids.

According to one or more aspects, the mixture ratio of the mixture of fluids including three or more kinds of fluids is calculated, but it is possible to calculate the concentration of each of the three kinds of fluids contained in the mixture of fluids and thus calculate the mixture ratio of the mixture of fluids.

According to one or more aspects, the mixture of fluids may contain four or more kinds of the fluids and include two or more kinds of the fluids composing a pseudo-component fluid whose mixture ratio can be calculated as the mixture ratio of one kind of fluid in a pseudo manner, and the mixture of fluids may contain three kinds of fluids including the fluids and the pseudo-component fluid.

This composition where the mixture of fluids containing four or more kinds of fluids include two or more kinds of fluids composing a pseudo-component fluid whose mixture ratio can be calculated as the mixture ratio of one kind of fluid in a pseudo manner allows the mixture of fluids to be treated as three kinds of fluids containing two kinds of fluids and one kind of pseudo-component fluid or three kinds of fluids containing one kind of fluid and two kinds of pseudo-component fluids. That is, it is possible to calculate, with the mixture of fluids containing four or more kinds of fluids treated as the mixture of fluids containing three kinds of fluids, the mixture ratio of the mixture of fluids. The two or more kinds of fluids composing the pseudo-component fluid are not limited to specific fluids. Further, the fluids composing the pseudo-component fluid are not limited to such two kinds of fluids, and three more kinds of fluids may compose one kind of pseudo-component fluid.

Further, according to one or more aspects, the pseudo-component fluid may contain two or more kinds of the fluids identical or similar to each other in the thermal property value.

Accordingly, since the pseudo-component fluid contains two or more kinds of fluids identical or similar to each other in thermal property value, it is possible to calculate, with the two or more kinds of fluids identical or similar to each other in thermal property value treated as one kind of fluid, the mixture ratio of the mixture of fluids in the same manner as the mixture ratio of the mixture of fluids containing three kinds of fluids.

Further, according to one or more aspects, the pseudo-component fluid may contain two or more kinds of the fluids identical or similar to each other in mixture ratio to the mixture of fluids.

Accordingly, since the pseudo-component fluid contains two or more kinds of fluids identical or similar to each other in mixture ratio to the mixture of fluids, it is possible to calculate, with the two or more kinds of fluids identical or similar to each other in mixture ratio treated as one kind of fluid, the mixture ratio of the mixture of fluids in the same manner as the mixture of fluids containing three kinds of fluids. The mixture ratios of two or more kinds of fluids composing the pseudo-component fluid may be different from values calculated according to one or more aspects and may be values obtained on the basis of a specification or the like.

Further, according to the one or more aspects, four or more kinds of the fluids may include the fluid whose mixture ratio to the mixture of fluids is equal to or less than a predetermined value and that is excluded from fluids whose mixture ratios are calculated.

Accordingly, it is possible to exclude, among four or more kinds of fluids included in the mixture of fluids, a fluid whose mixture ratio to the mixture of fluids is equal to or less than the predetermined value from fluids whose mixture ratios are calculated according one or more aspects, and calculate, with the other fluids treated as a mixture of fluids containing three kinds of fluids, the mixture ratio of the mixture of fluids. The predetermined value may be set as desired. Herein, the other fluids may be three kinds of fluids, or alternatively, may be a fluid treated as three kinds of fluids including two or more kinds of fluids composing the pseudo-component fluid. Further, when being significantly different in thermal property value from the other fluids included in the mixture of fluids, the fluid need not be excluded, even when the mixture ratio of the fluid to the mixture of fluids is equal to or less than the predetermined value, from fluids whose mixture ratios are calculated. Further, the mixture ratio of which the determination is made as to whether the mixture ratio is equal to or less than the predetermined value may be different from a value calculated according to one or more aspects and may be a value obtained on the basis of a specification or the like.

Further, according to one or more aspects, a basic information detector may include a temperature difference detector configured to output a signal corresponding to a temperature difference generated in the mixture of fluids, and a second heat generator configured to generate the temperature difference in the mixture of fluids. A mixture ratio calculator may be configured to cause the second heat generator to generate the temperature difference in the mixture of fluids, obtain the thermal property value of the mixture of fluids set to the first temperature on the basis of an output, from the temperature difference detector, with respect to the mixture of fluids set to the first temperature by the first heat generator, and obtain the thermal property value of the mixture of fluids set to the second temperature on the basis of an output, from the temperature difference detector, with respect to the mixture of fluids set to the second temperature by the first heat generator.

Accordingly, the basic information detector includes the second heat generator configured to generate the temperature difference in the mixture of fluids and the temperature difference detector configured to output a signal corresponding to the temperature difference generated in the mixture of fluids in accordance with the thermal property of the mixture of fluids. Then, the mixture ratio calculator causes the second heat generator to generate, in a localized manner, a temperature difference (temperature distribution) in the mixture of fluids set to the first temperature by the first heat generator, and obtains the thermal property value of the mixture of fluids set to the first temperature on the basis of the output from the temperature difference detector. The mixture ratio calculator further causes the second heat generator to generate, in a localized manner, a temperature difference (temperature distribution) in the mixture of fluids set to the second temperature by the first heat generator, and obtains the thermal property value of the mixture of fluids set to the second temperature on the basis of the output from the temperature difference detector. Since the temperature difference detector outputs a signal corresponding to the temperature difference generated in the mixture of fluids, it is possible to employ a property related to temperature distribution such as thermal conductivity as the thermal property of the mixture of fluids.

Further, according to one or more aspects, a mixture ratio calculator may be configured to obtain conversion information for use in conversion of the output from the temperature difference detector into the thermal property value of the mixture of fluids, convert the output from the temperature difference detector into the thermal property value of the mixture of fluids set to the first temperature on the basis of the conversion information, and convert the output from the temperature difference detector into the thermal property value of the mixture of fluids set to the second temperature on the basis of the conversion information.

Accordingly, the mixture ratio of the mixture of fluids can be calculated on the basis of the relationship between the thermal property value of the mixture of fluids and the mixture ratio of the first fluid that does not depends on properties of the temperature difference detector, as the first relationship information and the second relationship information.

Further, according to one or more aspects, a mixture ratio calculator may be configured to use, as the thermal property value of the mixture of fluids set to the first temperature, the output from the temperature difference detector with respect to the mixture of fluids set to the first temperature, and use, as the thermal property value of the mixture of fluids set to the second temperature, the output from the temperature difference detector with respect to the mixture of fluids set to the second temperature.

This eliminates the need of information for use in conversion of the output from the temperature difference detector into another thermal property value, so that the capacity of the storage device for these pieces of information can be reduced.

Further, according to one or more aspects, a first heat generator, the second heat generator, and the temperature difference detector may be formed on the same chip.

This allows the first heat generator and the second heat generator to be formed by the same process and thus allows a reduction in manufacturing cost. Further, since the first heat generator, the second heat generator, and the temperature difference detector are formed on the same chip, it is possible to reduce the size. Since the heat generated by the first heat generator and the second heat generator is applied only to a minimum necessary area that is the vicinity of the temperature difference detector, it is possible to reduce power consumption.

Further, the second heat generator may have the function of the first heat generator.

This allows the structure to be simplified and thus allows reductions in cost and size.

Further, the temperature difference detector may include a first temperature difference detector and a second temperature difference detector arranged at positions different in distance from the second heat generator.

Accordingly, the first temperature difference detector is disposed in a low temperature region away from the second heat generator, and the second temperature difference detector is disposed in a high temperature region adjacent to the second heat generator, thereby allowing the first temperature difference detector and the second temperature difference detector to obtain data at two temperatures. This increases responsiveness and accuracy. Further, since this eliminates the need of switching temperatures of the second heat generator having the function of the first heat generator, the control becomes simple.

Further, according to one or more aspects, a first heat generator may include a first temperature heater configured to set the mixture of fluids to the first temperature and a second temperature heater configured to set the mixture of fluids to the second temperature.

This allows the first temperature heater and the second temperature heater to simultaneously measure data at the first temperature and the second temperature, increases responsiveness and accuracy, and eliminates the need of switching heating temperatures of the first heat generator, thereby making the control simple.

A temperature detector configured to detect the temperature of the mixture of fluids may be included.

This prevents, through detection of temperature, the first heat generator from unnecessarily generating heat and thus allows a reduction in power consumption. Further, since the first heat generator does not unnecessarily generate heat, the lifetime of the first heat generator is increased. Further, since the ambient temperature of the temperature difference detector can be made constant, the detection result is not affected by the environmental temperature, which eliminates the need of the cost of temperature calibration.

Further, according to one or more aspects, the thermal property value may be any one of thermal conductivity, electrical conductivity, permittivity, or sound velocity.

The thermal property value is a property value that varies in a manner that depends on heat; therefore, it is possible to select the thermal property value from among thermal conductivity, electrical conductivity, permittivity, and sound velocity with consideration given to factors such as properties of fluid and differences in thermal properties of the fluids contained in the mixture of fluids.

Further, according to one or more aspects, the fluids are gas or liquid.

Thus, according to one or more aspects, the mixture ratio for both gas and fluid can be calculated.

Further, according to one or more aspects, an argon concentration may be calculated as a mixture ratio to a mixture of gases containing oxygen, nitrogen, and argon in which the oxygen is concentrated.

Accordingly, in an oxygen concentrator in which air as the mixture of gases containing oxygen, nitrogen, and argon is compressed by a compressor, and the nitrogen is adsorbed from the air compressed to concentrate the oxygen, it is possible to determine whether the adsorption of nitrogen is suitably made on the basis of the argon concentration calculated and concentrate the oxygen to a suitable concentration by regulating the pressure of the compressor so as to optimize the adsorption amount of nitrogen.

Further, according to one or more aspects, the first relationship information may be a coefficient of a relational expression that defines the relationship between the thermal property value of the mixture of fluids set to the first temperature and the mixture ratio of the first fluid to the mixture of fluids, and the second relationship information may be a coefficient of a relational expression that defines the relationship between the thermal property value of the mixture of fluids set to the second temperature and the mixture ratio of the first fluid to the mixture of fluids.

Accordingly, only the use of the coefficient of the relational expression obtained allows the relationships between the thermal property value of the mixture of fluids set to the first temperature and the mixture ratio of the first fluid and between the thermal property value of the mixture of fluids set to the second temperature and the mixture ratio of the first fluid to be obtained through calculation using the relational expression, so that the capacity of the storage device can be reduced.

Further, according to one or more aspects, the first relationship information may be a curve that associates the thermal property value of the mixture of fluids set to the first temperature with the mixture ratio of the first fluid to the mixture of fluids, and the second relationship information may be a curve that associates the thermal property value of the mixture of fluids set to the second temperature with the mixture ratio of the first fluid to the mixture of fluids.

This allows the calculation for obtaining the relationships between the thermal property value at the first temperature and the mixture ratio of the first fluid and between the thermal property value at the second temperature and the mixture ratio of the first fluid to be simplified. Further, the use of a known curve makes it resistant to noise.

The first heat generator may be caused to generate heat when the mixture ratio of the mixture of fluids is calculated.

This prevents the first heat generator from unnecessarily generating heat and thus allows a reduction in power consumption. This further allows an increase in lifetime of the first heat generator.

According to one or more aspects, it is possible to calculate the component ratio of the mixture of fluids containing three or more kinds of components.

BRIEF DESCRIPTION OF THE DRAWINGS

FIGS. 22A and 22B are graphs showing a relationship between sensor output and oxygen concentration according to a conventional example.

DETAILED DESCRIPTION (Application Example)

Figure 1:
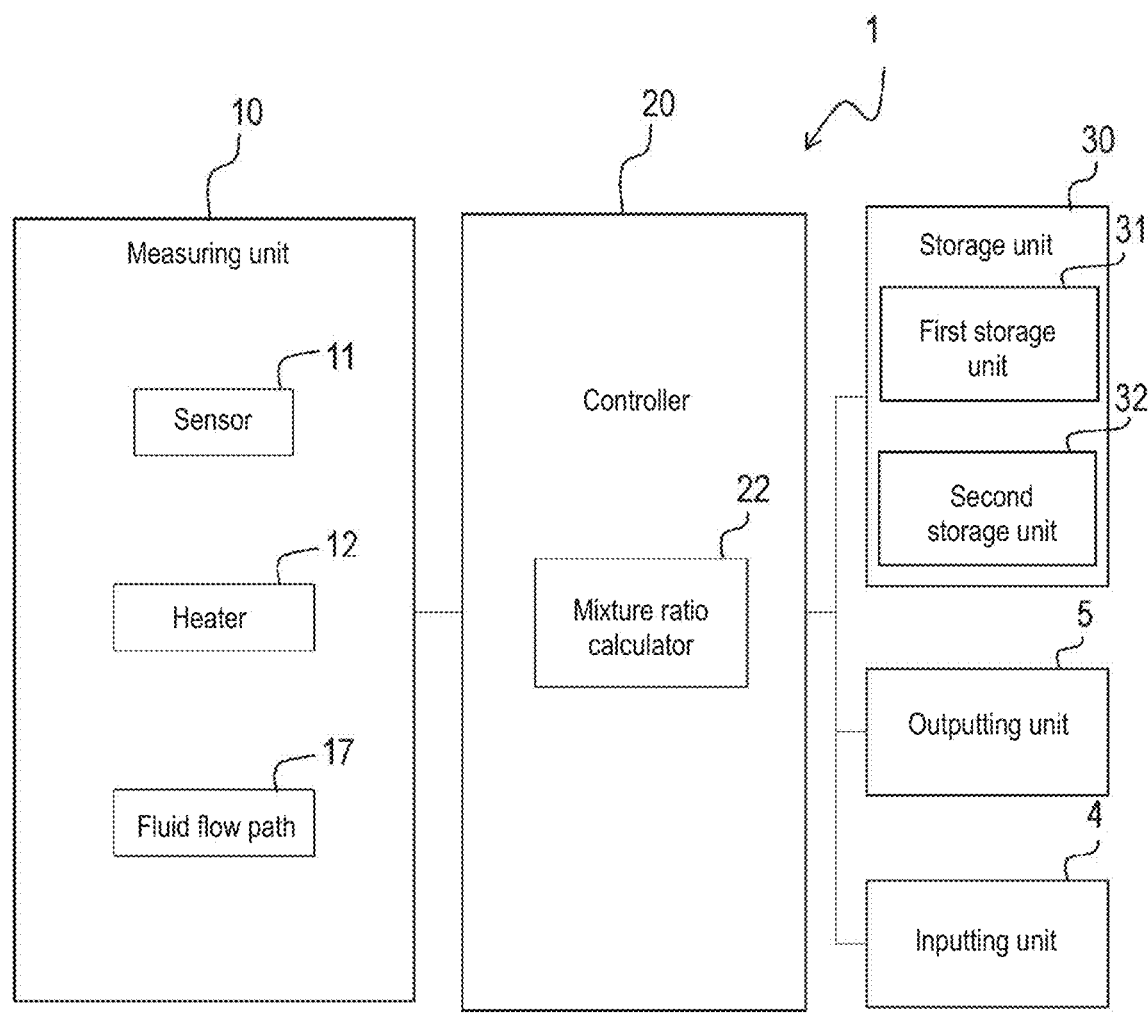
FIG. 1 is a functional block diagram of a mixture ratio calculation device according to an application example of one or more aspects.
Figure 2:
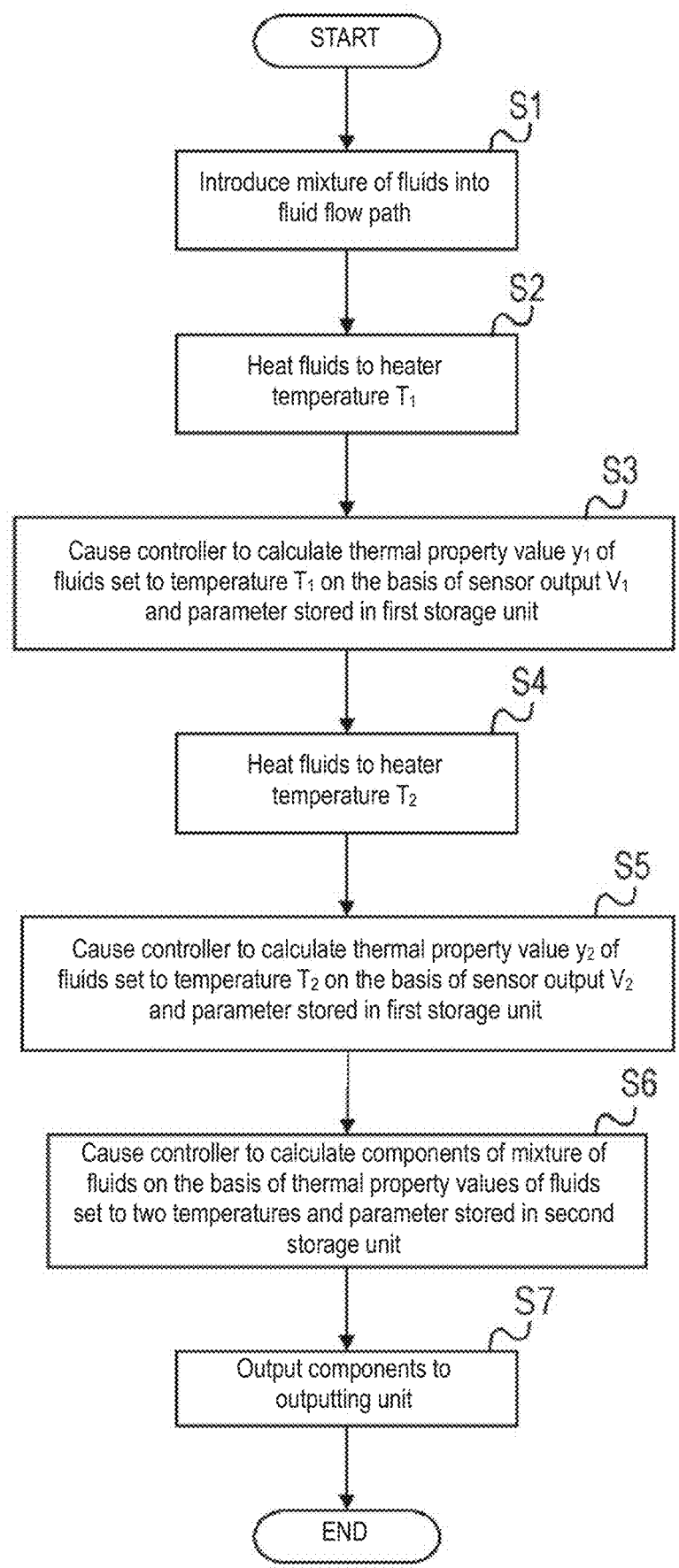
FIG. 2 is a flowchart showing a procedure of a mixture ratio calculation process according to an application example of one or more aspects.

Hereinafter, an application example of one or more aspects will be described with reference to the drawings. FIG. 1 is a functional block diagram schematically showing a structure of a mixture ratio calculation device 1 to which one or more aspects are applied. FIG. 2 is a flowchart showing an outline of a mixture ratio calculation process.

The mixture ratio calculation device 1 is a device that calculates a mixture ratio of a mixture of fluids containing three or more kinds of components. A case where a mixture ratio of a mixture of fluids containing three kinds of fluids is calculated will be described below as an example. The mixture ratio calculation device 1 primarily includes a measuring unit 10, a controller 20, a storage unit 30, an inputting unit 4, and an outputting unit 5. The measuring unit 10 includes a sensor 11 that detects a property that varies in a manner that depends on heat of the mixture of fluids, a heater 12 that heats the mixture of fluids, and a flow path 17 for the mixture of fluids. The controller 20 includes at least a mixture ratio calculator 22. The controller 20 specifically includes a central processing unit (CPU) and storage devices such as a read only memory (ROM) and a random access memory (RAM). Loading a program stored in the ROM or the like onto a work area such as the RAM and causing the CPU to execute the program enables each function that meets a predetermined purpose such as calculation of the mixture ratio. The storage unit 30 includes a first storage unit 31 and a second storage unit 32 each structured of a non-volatile storage device such as an erasable programmable read only memory (EPROM), and stores information such as a parameter necessary for the mixture ratio calculation process. The inputting unit 4 is a unit that receives user input, and the outputting unit 5 is a unit that outputs information.

For a mixture of fluids containing two kinds of fluids that have different properties that vary in a manner that depends on heat (hereinafter, also referred to as "thermal property"), a relationship between the thermal property and the mixture ratio (component ratio) of the mixture of fluids based on temperature is uniquely determined with respect to temperature. Therefore, provided that the relationship between the thermal property and the mixture ratio of the mixture of fluids based on temperature is obtained in advance, the mixture of fluids flowing through the flow path 17 is heated to a predetermined temperature by the heater 12, and the thermal property of the mixture of fluids is detected by the sensor 11, so that the mixture ratio of the mixture of fluids can be calculated.

On the other hand, when the mixture of fluids contains three kinds of fluids, the relationship between the thermal property and mixture ratio of the mixture of fluids based on temperature is not uniquely determined. That is, the relationship between the thermal property of the mixture of fluids and a mixture ratio of a specific fluid contained in the mixture of fluids at a certain temperature varies in a manner that depends on a mixture ratio of any other fluid contained in the mixture of fluids, so that it is not possible to calculate the mixture ratio of the specific fluid only by detecting the thermal property at one temperature. However, when the thermal property of the mixture of fluids set to a temperature different from the above-described temperature is detected, the mixture ratio of the specific fluid corresponding to a thermal property value of the mixture of fluids set to each of the temperatures is constant, so that the use of this relationship makes it possible to determine which of the relationships with the mixture ratio of the specific fluid contained in the mixture of fluids that vary in a manner that depends on any other mixture ratio of fluids is appropriate. Therefore, the mixture ratio of the specific fluid can be calculated from the thermal property value of the mixture of fluids at any one of the temperatures.

Therefore, in the mixture ratio calculation device 1 to which one or more aspects are applied, the mixture ratio of the mixture of fluids containing three kinds of fluids is calculated in accordance with a processing procedure as shown in FIG. 2.

First, the mixture of fluids is introduced into the flow path 17 (step S1). Next, with a temperature of the heater 12 set to $T_1$, the mixture of fluids is heated (step S2). Then, the controller 20 calculates a thermal property value $y_1$ of the mixture of fluids set to the temperature $T_1$ on the basis of an output $V_1$ from the sensor 11 and a parameter stored in the first storage unit 31 (step S3).

Next, with the temperature of the heater 12 set to $T_2$, the mixture of fluids is heated (step S4). Then, the controller calculates a thermal property value $y_2$ of the mixture of fluids set to the temperature $T_2$ on the basis of an output $V_2$ from the sensor 11 and a parameter stored in the first storage unit 31 (step S5).

Next, the controller 20 calculates components of the mixture of fluids on the basis of the thermal property values of the mixture of fluids set to the two temperatures $T_1$, $T_2$ calculated in step S3 and step S5 and a parameter stored in the second storage unit 32 (step S6). Then, the mixture ratio of each fluid contained in the mixture of fluids is output to the outputting unit 5 (step S7).

Here, examples of the fluid include gas and liquid, and the mixture of fluids may be a mixture of gases in which gases are mixed or a mixture of liquids in which liquids are mixed. Further, it is preferable that the thermal property of the mixture of fluids be largely different between the fluids contained in the mixture of fluids. Therefore, in consideration of such differences and the like, it is possible to select the thermal property from among thermal conductivity, sound velocity, electrical conductivity, permittivity, and the like. Further, in the above-described process, the thermal property value of the mixture of fluids is calculated on the basis of the output from the sensor 11, but, provided that a relationship between the output from the sensor 11 and the mixture ratio of the mixture of fluids is obtained in advance, the mixture ratio of the mixture of fluids can be calculated without calculating the thermal property value.

Although the description has been given of the mixture of fluids containing three kinds of fluids, two or more kinds of fluids identical or similar to each other in mixture ratio or thermal property value can be treated as one kind of fluid, that is, one kind of component, in a pseudo manner for the mixture ratio calculation process. Therefore, defining two or more kinds of fluids that can be treated as one kind of fluid in a pseudo manner as a pseudo-component fluid and treating a mixture of fluids including the pseudo-component fluid as the mixture of fluids containing three kinds of fluids makes the above-described invention applicable to a mixture of fluids including three or more kinds of fluids.

First Embodiment

Hereinafter, a mixture ratio calculation device 2 according to one or more aspects will be described in more detail with reference to the drawings. A mixture ratio calculation device 2 that calculates a mixture ratio of a mixture of fluids containing three kinds of fluids as a basic aspect of one or more aspects will be described.

<Device Structure>

Figure 3A:
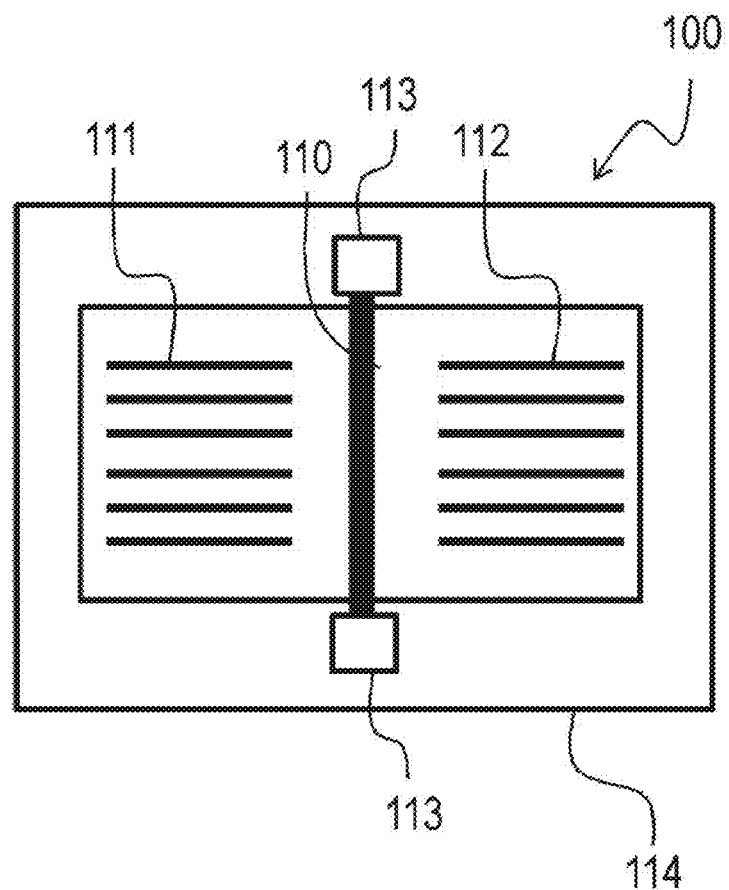
FIGS. 3A and 3B are diagrams showing a detection element of a mixture ratio calculation device according to a first embodiment.
Figure 3B:
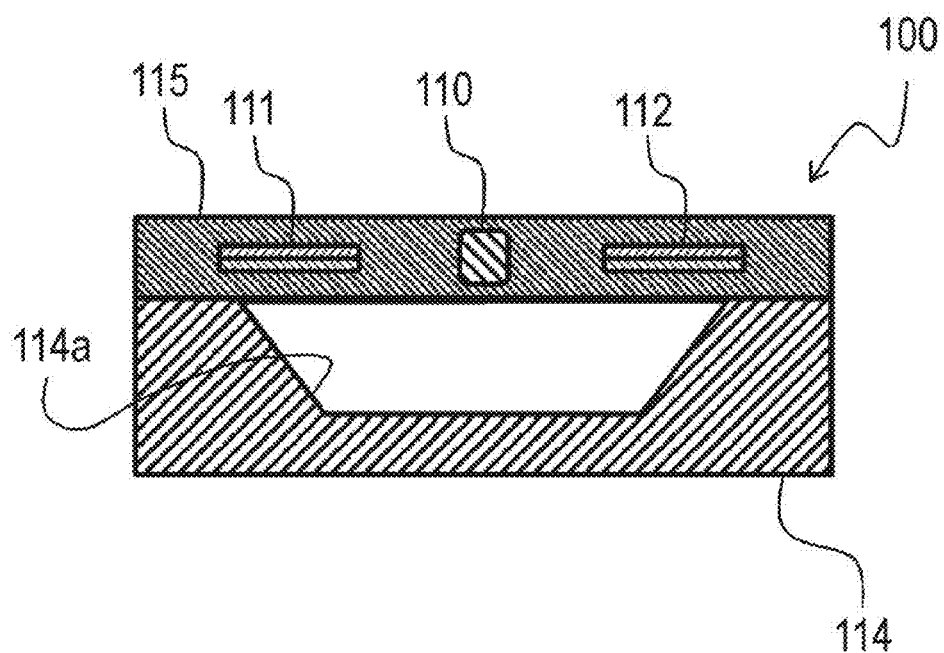

FIG. 3A is a plan view showing an example of a detection element 100 built in the mixture ratio calculation device 2 according to an embodiment. FIG. 3B is a cross-sectional view of the detection element, showing a schematic structure of the detection element. The mixture ratio calculation device 2 according to an embodiment and one or more of the following embodiments also serves as a flow rate measuring device capable of measuring a flow of a mixture of fluids and is built in, for example, industrial equipment such as a gas sensor, a gas flow meter, an oxygen concentrator, a breath tester, and any other medical equipment, and embedded equipment. The mixture ratio calculation device 2 measures a flow rate of fluid flowing through the flow path and calculates a component ratio of the mixture of fluids.

Further, as shown in FIG. 3A, the detection element 100 according to an embodiment includes a detection-use micro-heater 110, a first thermopile 111 and a second thermopile 112. The detection-use micro-heater 110 is, for example, a resistor made of polysilicon, and is provided along the center of the detection element 100. An insulation thin film is formed all over upper surfaces (on the front side of FIG. 3A) of the detection-use micro-heater 110, the first thermopile 111, and the second thermopile 112, but is not shown in FIG. 3A. The detection element 100 further includes electrode pads 113, 113 and a circuit board 114. As shown in FIG. 3B, a cavity 114a is provided in the circuit board 114 below the first thermopile 111 and the second thermopile 112 (on the back side of FIG. 3B). Further, an insulation thin film 115 is formed all over the upper surfaces of the detection-use micro-heater 110, the first thermopile 111, and the second thermopile 112. Here, the detection-use micro-heater 110 corresponds to a "second heat generator" according to one or more aspects. Further, the second thermopile 112 (and/or the first thermopile 111) corresponds to a "temperature difference detector that outputs a signal corresponding to a temperature difference generated in the mixture of fluids" according to one or more aspects. Then, the detection-use micro-heater 110 and the second thermopile 112 (and/or the first thermopile 111) correspond to a "basic information detector" according to one or more aspects. Further, an output from the second thermopile 112 (and/or the first thermopile 111) corresponds to "basic information" according to one or more aspects. Here, a gas to be measured is forced to flow parallel to FIG. 3B over the upper surface of the detection element. The detection element is disposed such that the first thermopile 111 is located upstream in the gas flow direction, and the second thermopile 112 is located downstream in the gas flow direction. According to one or more embodiments, a heating heater 116 for heating the gas to be measured is disposed, separately from a chip where the detection element 100 is disposed, at an appropriate position located upstream of the gas introduced into the detection element. According to one or more embodiments, the heating heater 116 corresponds to a "first heat generator" according to one or more aspects.

Figure 4:
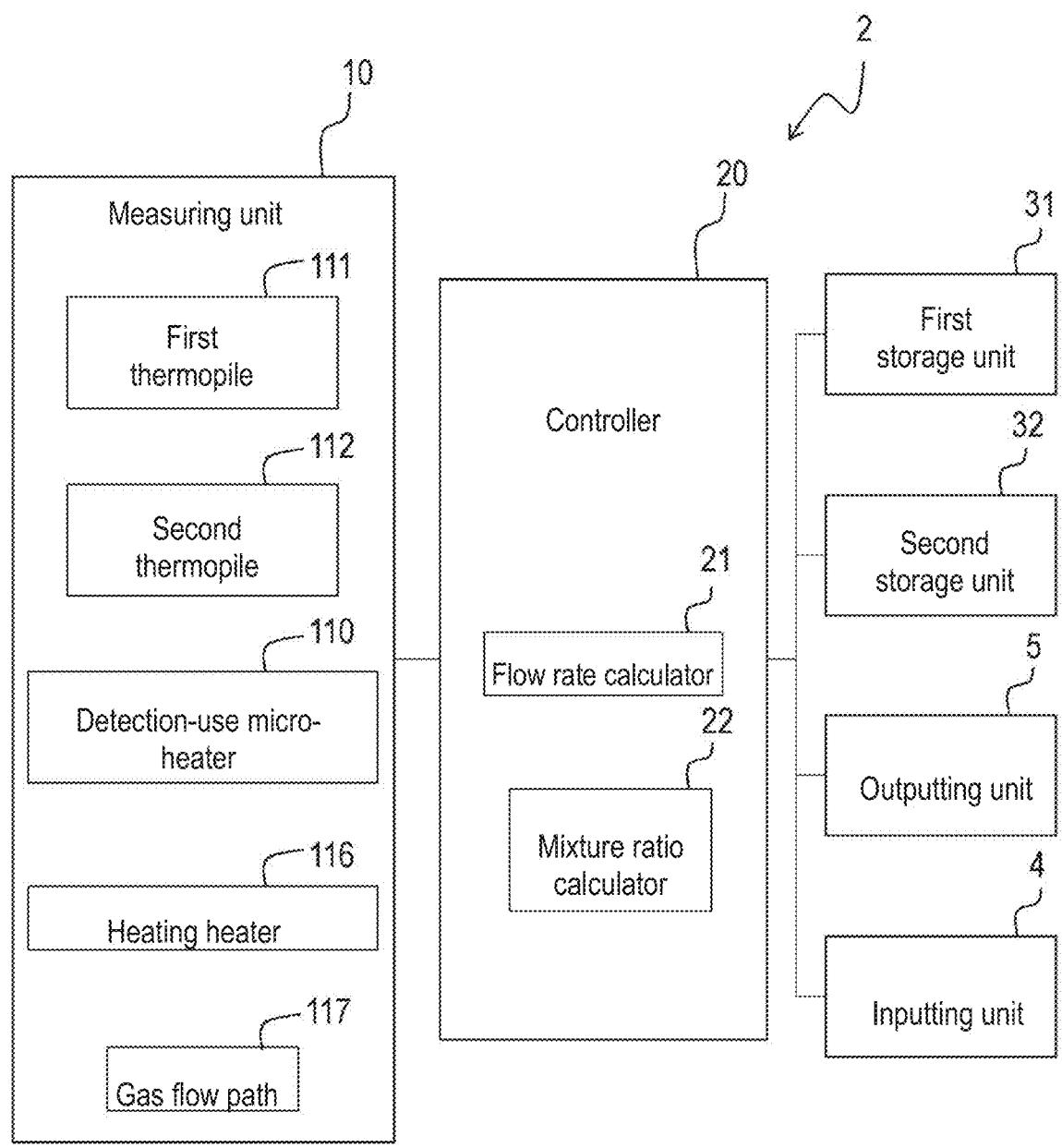
FIG. 4 is a functional block diagram of the mixture ratio calculation device according to a first embodiment.

FIG. 4 is a functional block diagram of the mixture ratio calculation device 2 according to one or more aspects. A measuring unit 10 includes the first thermopile 111, the second thermopile 112, the detection-use micro-heater 110, the heating heater 116, and a gas flow path 117.

A controller 20 includes a flow rate calculator 21 and a mixture ratio calculator 22. The controller 20 includes a central processing unit (CPU) and a storage device such as a read only memory (ROM) and a random access memory (RAM). Loading a program stored in the ROM or the like onto a work area such as the RAM and causing the CPU to execute the program enables each function that meets a predetermined purpose as described below.

A first storage unit 31 and a second storage unit 32 are each structured of a non-volatile storage device such as an erasable programmable read only memory (EPROM). The first storage unit 31 and the second storage unit 32 are not limited to storage devices physically separate from each other. An inputting unit 4 is a unit that receives user input, and is structured of, for example, a touchscreen display, a keyboard, or the like. An outputting unit 5 is a unit that outputs information such as a measurement result, and includes a display unit such as a touchscreen display that displays and outputs information, but is not limited to such a unit, and may include a communication unit that transmits the information to an external device to output the information.

<Principle of Flow Rate Measurement>

Figure 5A:
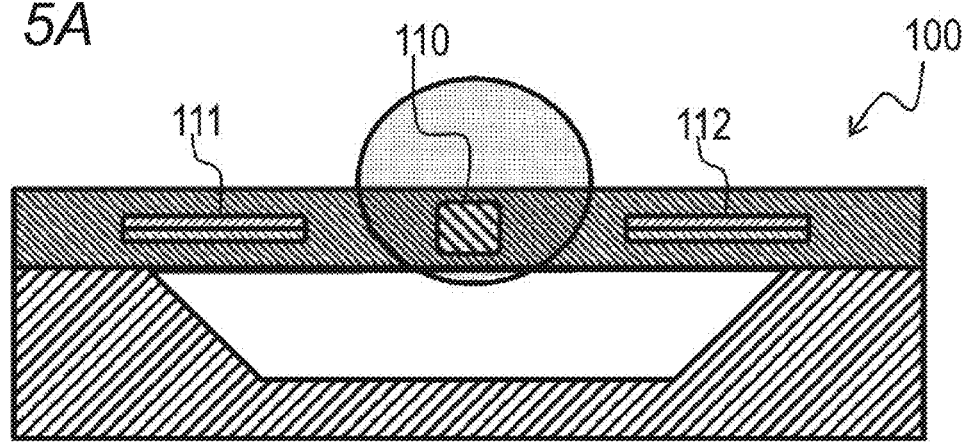
FIGS. 5A to 5C are diagrams showing a principle of flow rate measurement according to a first embodiment.
Figure 5B:
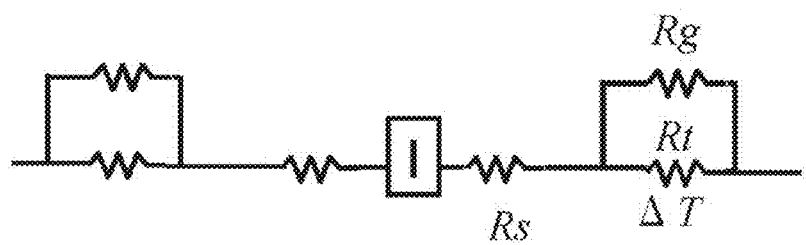
Figure 5C:
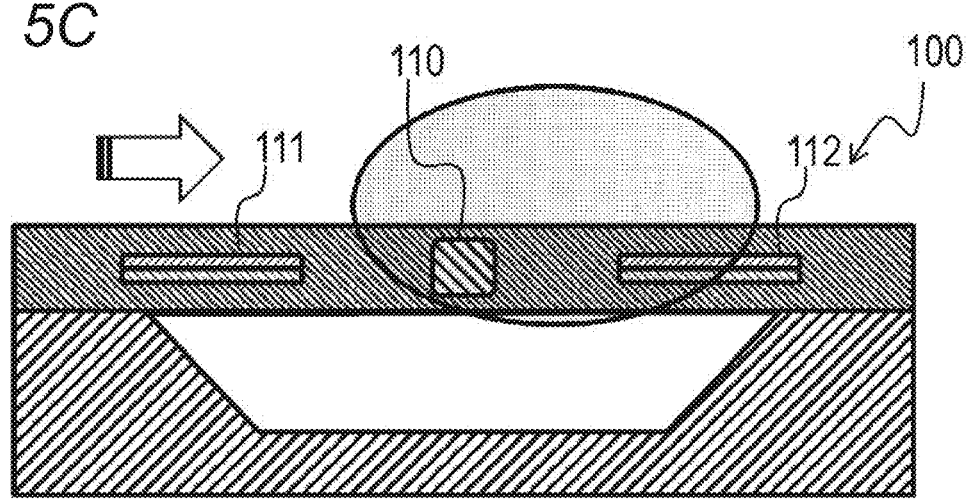

A principle of flow rate measurement using the detection element 100 will be described. FIG. 5A schematically shows an example of temperature distribution when the detection-use micro-heater 110 is in operation in a state where no gas flows through the gas flow path 117 in which a flow sensor is installed. FIG. 5B is a thermal circuit diagram in which a heat flow in the detection element is represented by a circuit. FIG. 5C schematically shows an example of temperature distribution when the detection-use micro-heater 110 is in operation in a state where a gas flows through the gas flow path 117 in which the flow sensor is installed.

First, prior to giving the description of the principle of gas flow rate measurement using a thermal type flow sensor to which one or more aspects are applied, a principle of gas thermal conductivity measurement will be described with reference to FIG. 5B.

Here, an amount of heat generated by the heater denoted by I, a thermal resistance of the insulation thin film is denoted by Rs, a thermal resistance of the thermopile is denoted by Rt, a thermal resistance of the gas is denoted by Rg, and a temperature difference across the thermopile is denoted by $\Delta T$. At this time, in the circuit shown in FIG. 5B, $\Delta T$ is expressed by the following equation (1) when no gas flows:

[EQ. 1]
$$\Delta T = \frac{I}{2} \frac{1}{\frac{1}{Rt} + \frac{1}{Rg}} \qquad (1)$$

which shows that the temperature difference $\Delta T$ across the thermopile varies in a manner that depends on the thermal resistance Rg of the gas. Therefore, the use of the thermopile that outputs a value proportional to the temperature difference $\Delta T$ across the thermopile allows not only the thermal resistance of the gas but also the thermal conductivity of the gas to be calculated.

Next, the principle of gas flow rate measurement using a thermal type flow sensor will be described. When no gas flows through the gas flow path 117 in which the flow sensor is installed, the heat generated by the detection-use micro-heater 110 diffuses from the detection-use micro-heater 110 in a symmetrical manner. Therefore, no difference is generated between outputs from the first thermopile 111 and the second thermopile 112. On the other hand, when the gas flows through the gas flow path 117 in which the flow sensor is installed, the heat generated by the detection-use micro-heater 110 is affected by the flow of the gas indicated by the arrow, preventing the heat from diffusing from the detection-use micro-heater 110 in a symmetrical manner and causing the heat to diffuse toward the second thermopile 112 located downstream. Therefore, a difference is generated between outputs from the first thermopile 111 and the second thermopile 112. Further, the greater the flow rate of the gas, the larger the difference between outputs from the first thermopile 111 and the second thermopile 112.

Such a relationship between the flow rate of the gas and the difference between the outputs from the first thermopile 111 and the second thermopile 112 is expressed, for example, by the following equation (2):

[EQ. 2]
$$\Delta V = A(T_B - T_A)\sqrt[b]{v_f} \qquad (2)$$

where $\Delta V$ denotes the difference between the outputs from the first thermopile 111 and the second thermopile 112, $T_A$ denotes an environmental temperature, and $T_B$ denotes a heater temperature. Further, $v_f$ is a fluid flow velocity, and A and b are constants. In the mixture ratio calculation device that also serves as the flow rate measuring device according to an embodiment, the gas to be measured is introduced into the flow sensor and the detection-use micro-heater 110 is put into operation in accordance with an instruction from the flow rate calculator 21. Then, the outputs from the first thermopile 111 and the second thermopile 112 are obtained, and the flow rate of the gas to be measured is calculated from the above-described equation.

<Mixture Ratio Calculation Process>

Figure 6:
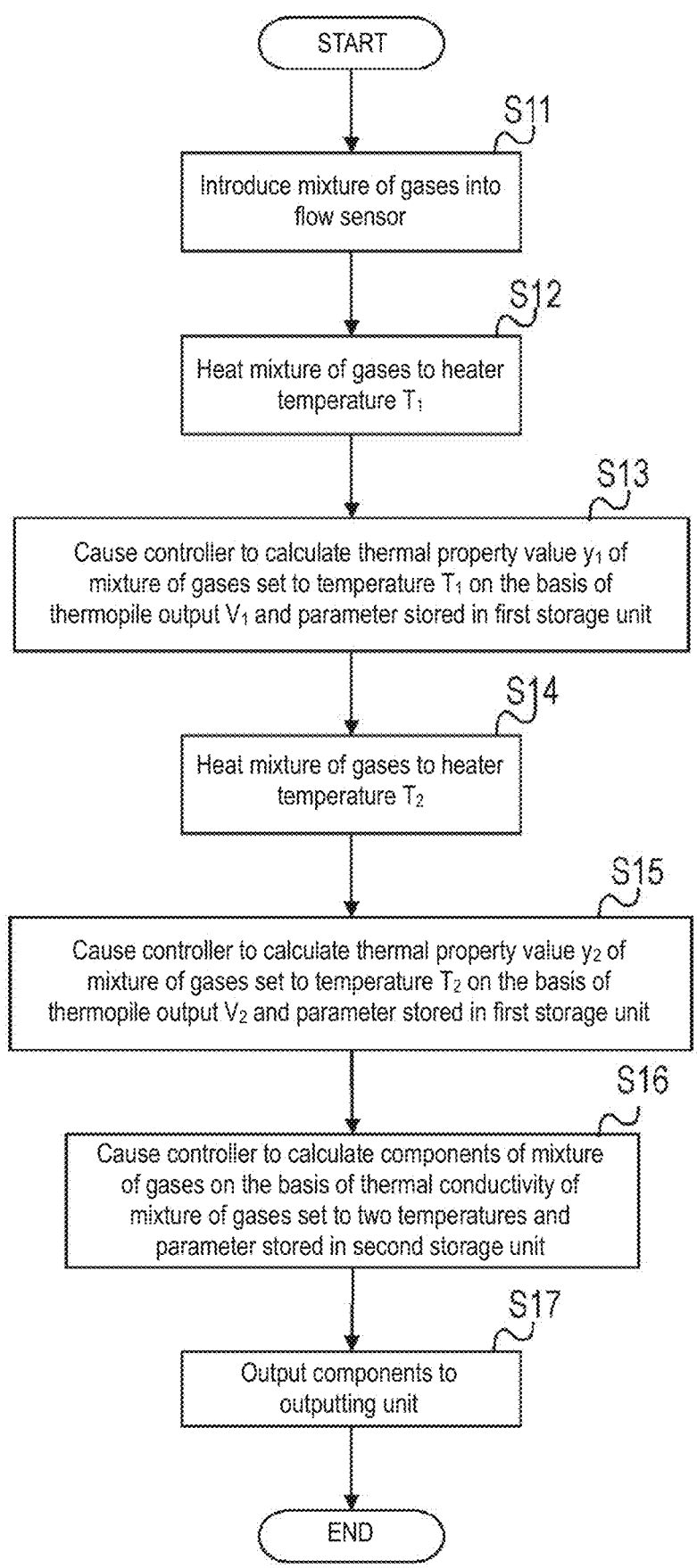
FIG. 6 is a flowchart showing a procedure of a mixture ratio calculation process according to a first embodiment.

A mixture ratio calculation process will be described with reference to the flowchart shown in FIG. 6. Note that, in the following description, when referring to a mixture of gases containing oxygen and argon, unless otherwise specified, oxygen concentration indicates an oxygen content relative to the total volume of the mixture of gases, and argon concentration indicates an argon content relative to the oxygen content.

First, prior to the start of the mixture ratio calculation process, relationships between the oxygen concentration and the thermal conductivity of the mixture of gases calculated from the output value from the second thermopile 112 are obtained in advance for some argon concentrations. Then, a parameter that defines the relationship between the oxygen concentration and the thermal conductivity of the mixture of gases calculated from the output value from the second thermopile 112 is stored in the second storage unit 32 for each of the argon concentrations. According to an embodiment, the parameter that defines the relationship between the oxygen concentration and the thermal conductivity of the mixture of gases calculated from the output value from the second thermopile 112 corresponds to "second relationship information" according to one or more aspects. Note that a parameter for use in calculation of the thermal conductivity of the mixture of gases from the output from the second thermopile 112 is stored in the first storage unit 31. Herein, the parameter for use in calculation of the thermal conductivity of the mixture of gases from the output from the second thermopile 112 corresponds to "first relation information" according to one or more aspects. Further, according to an embodiment, the thermal conductivity corresponds to a "thermal property" according to one or more aspects. Some argon concentrations described above are not limited to discretely varying argon concentrations, but may be continuously varying argon concentrations. The above-described process in which the relationship between the oxygen concentration and the thermal conductivity of the mixture of gases calculated from the output value from the second thermopile 112 for some argon concentrations is obtained, and the parameter that defines the relational expression between the oxygen concentration and the thermal conductivity of the mixture of gases calculated from the output value from the second thermopile 112 for each of the argon concentrations is stored in the second storage unit is performed at two temperatures of the heating heater (here, $T_1$ and $T_2$).

Figure 7:
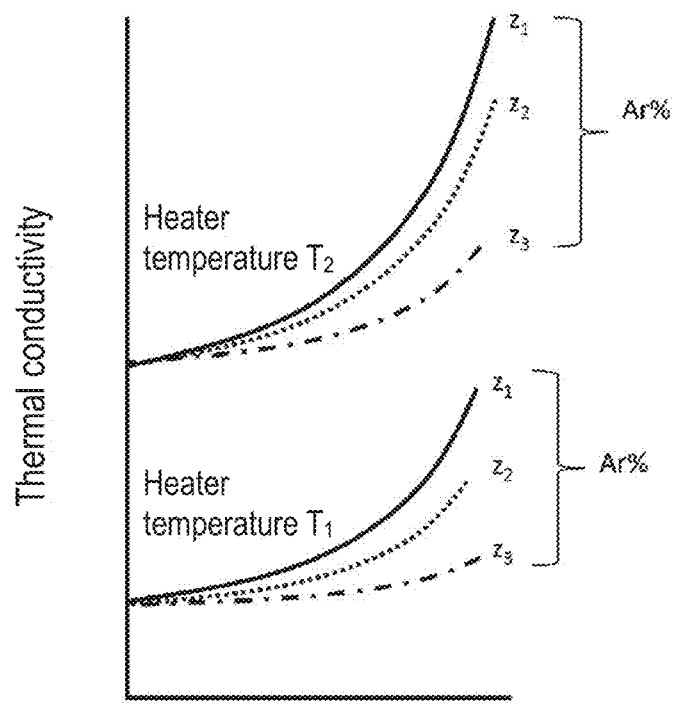
FIG. 7 is a graph showing a relationship between thermal conductivity of a mixture of gases and oxygen concentration according to a first embodiment.

Thus, FIG. 7 shows an example of relationships between the oxygen concentration and the thermal conductivity of the mixture of gases calculated from the output value from the second thermopile 112 for three argon concentrations obtained at the two temperatures $T_1$ and $T_2$ of the heating heater 116. Here, the relationships are for three argon concentrations. Although only relationships between the oxygen concentration and the thermal conductivity are shown, the number of argon concentrations is not limited to such a number. Here, relationships between the oxygen concentration and the thermal conductivity of the mixture of gases calculated from the output value from the second thermopile 112 for argon concentrations $z_1$, $z_2$, $z_3$ are obtained at the temperatures $T_1$ and $T_2$ of the heating heater 116. A solid line indicates a relationship between oxygen and the thermal conductivity of the mixture of gases at the argon concentration $z_1\%$, a dotted line indicates a relationship at $z_2\%$, and a long dashed short dashed line indicates a relationship at $z_3\%$.

The mixture ratio calculation process will be described below. First, the mixture ratio calculator 22 introduces the mixture of gases into the gas flow path 117 in which the flow sensor is installed (step S11). Next, the mixture ratio calculator 22 puts the detection-use micro-heater 110 into operation to heat the heating heater 116 to the temperature $T_1$ (step S12). The following description, including the descriptions of one or more other embodiments, will be given of a case where the mixture of fluids (mixture of gases) is heated to $T_1$ that is the first temperature and $T_2$ that is the second temperature by the heating heater 116. However, when a lower temperature (for example, $T_1$) of the temperatures is defined as the environmental temperature (room temperature), the heating heater 116 may be controlled not to generate heat and controlled to generate heat only for $T_2$.

Figure 8:
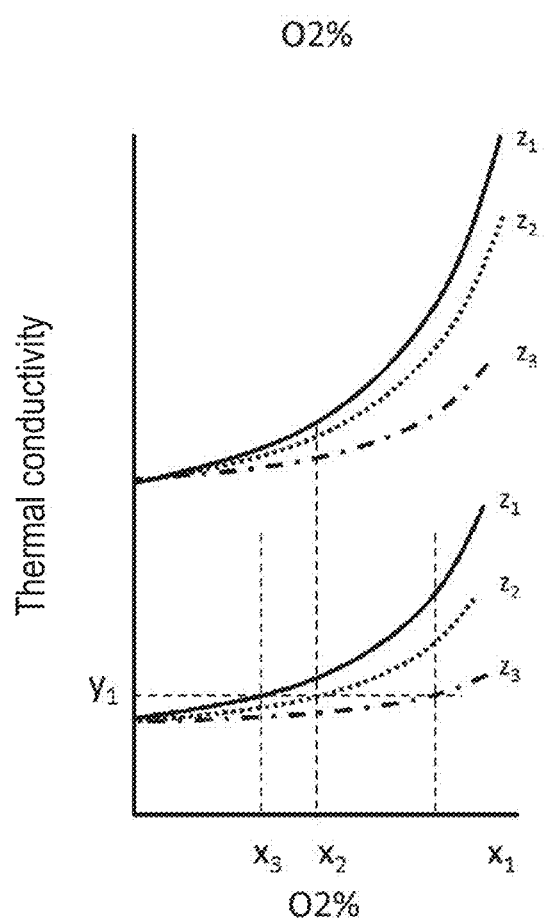
FIG. 8 is a graph showing the relationship between thermal conductivity of the mixture of gases and oxygen concentration according to a first embodiment.

Then, the mixture ratio calculator 22 obtains the output value $V_1$ from the second thermopile 112, and calculates the thermal conductivity of the mixture of gases set to the temperature $T_1$ on the basis of the output value $V_1$ and the parameter stored in the first storage unit 31 (step S13). The first storage unit 31 stores a parameter unique to the second thermopile 112, such as a coefficient for use in conversion of the output value from the second thermopile 112 into the thermal conductivity of the mixture of gases. Here, the parameter stored in the first storage unit 31 corresponds to the "conversion information" according to one or more aspects. The thermal conductivity thus calculated is denoted by $y_1$. At this time, as shown in FIG. 8, according to the information on the relationship between the thermal conductivity of the mixture of gases and the oxygen concentration stored in the second storage unit 32, with the temperature of the heating heater 116 set to $T_1$, the oxygen concentration corresponds to $x_1\%$ at the argon concentration of $z_1\%$, the oxygen concentration corresponds to $x_2\%$ at the argon concentration of $z_2\%$, and the oxygen concentration corresponds to $x_3\%$ at the argon concentration of $z_3\%$. That is, it is not possible to calculate, only from the thermal conductivity $y_1$ of the mixture of gases with the temperature of the heating heater 116 set to $T_1$, the oxygen concentration corresponding to the thermal conductivity $y_1$.

Next, the mixture ratio calculator 22 heats the heating heater 116 to the temperature $T_2$ with the detection-use micro-heater 110 in operation (step S14). Then, the mixture ratio calculator 22 obtains the output value $V_2$ from the second thermopile 112, and calculates the thermal conductivity of the mixture of gases on the basis of the output value $V_2$ and the parameter stored in the first storage unit 31. The thermal conductivity thus calculated is denoted by $y_2$ (step S15).

Here, with the temperature of the heating heater 116 set to $T_2$ and the argon concentrations $z_1$, $z_2$, $z_3$, the relationships between the oxygen concentration and the thermal conductivity of the mixture of gases calculated from the output value from the second thermopile 112 are retrieved from the first storage unit 31. These relationships correspond to three curves shown on an upper side of FIG. 7.

Figure 9:
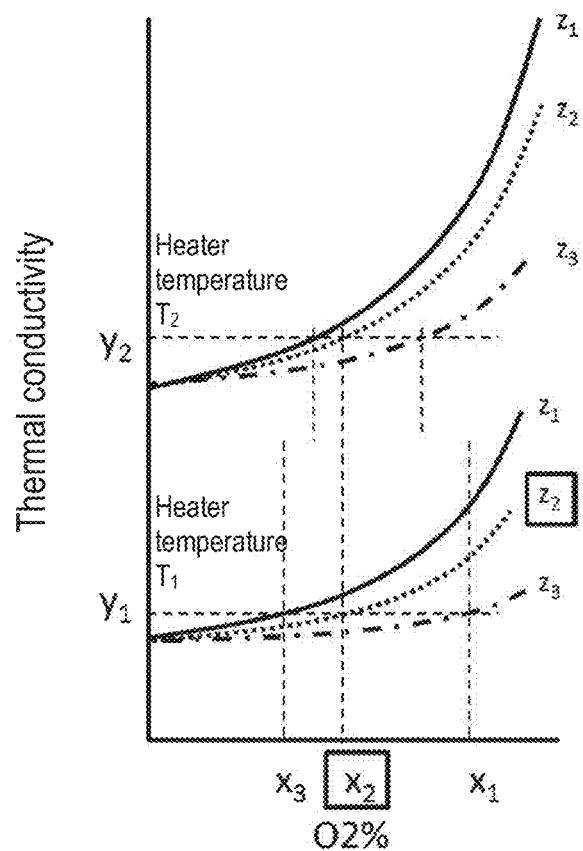
FIG. 9 is a graph showing a principle of the mixture ratio calculation process according to a first embodiment.

Then, the mixture ratio calculator 22 calculates the mixture ratio of the mixture of gases on the basis of the thermal conductivity of the mixture of gases set to the two temperatures $T_1$ and $T_2$ and the parameter stored in the second storage unit 32 (step S16). At this time, the parameter stored in the second storage unit 32 correspond to the relationship, as shown in FIG. 7, between the thermal conductivity of the mixture of gases and the oxygen concentration at the two temperatures $T_1$ and $T_2$ that is dependent on the argon concentration. As shown in FIG. 9, since the oxygen concentration corresponding to the thermal conductivity $y_1$ of the mixture of gases set to the temperature $T_1$ and the oxygen concentration corresponding to the thermal conductivity $y_2$ of the mixture of gases set to the temperature $T_2$ are the same, a curve is extracted where the oxygen concentration corresponding to the thermal conductivity $y_2$ of the mixture of gases calculated from the output from the second thermopile 112 is $x_2$ that is the same as the oxygen concentration corresponding to the thermal conductivity $y_1$. Then, the argon concentration $z_2$ corresponding to this curve is calculated as the argon concentration in the mixture of gases to be measured. Further, $x_2$ at which the thermal conductivity at the temperature $T_1$ is $y_1$ and the thermal conductivity at the temperature $T_2$ is $y_2$ is calculated as the oxygen concentration in the mixture of gases to be measured. As described above, the mixture ratio to the mixture of the three kinds of gases can be calculated.

As described above, according to an embodiment, when the relationship between the thermal conductivity of the mixture of gases and the oxygen concentration is held for different argon concentrations and two temperatures, it is possible to calculate the thermal conductivities of the mixture of gases set to the temperatures and calculate the oxygen concentrations in the mixture of gases as oxygen concentrations that make the oxygen concentrations corresponding to the thermal conductivities equal to each other. Then, argon concentration corresponding to a relationship that makes the oxygen concentration equal to the above-described value with respect to the thermal conductivity of the mixture of gases at each temperature is calculated as the argon concentration in the mixture of gases.

A theoretical background of the above-described process of calculating the mixture ratio of the mixture of three kinds of gases will be described below. It is assumed that, with the oxygen concentration (%) denoted by x, and the thermal conductivity of the mixture of gases calculated from the output from the second thermopile 112 denoted by y, the thermal conductivity $y_1$ and the thermal conductivity $y_2$ are obtained at the temperature $T_1$ and temperature $T_2$ of the heating heater 116, respectively, for the mixture of gases containing three components of oxygen, argon, and nitrogen. At this time, relationships between $y_1$, $y_2$ and x are expressed by the following equations (3) and (4):

[EQ. 3]

$$y_1 = a_1 x^2 + b_1 x + c_1 \quad (3)$$

[EQ. 4]

$$y_2 = a_2 x^2 + b_2 x + c_2 \quad (4)$$

here, it is assumed that when the oxygen concentration (%) is 0, thermal conductivity $y_{01}$ is obtained at the temperature $T_1$ of the heating heater 116, and thermal conductivity $y_{02}$ is obtained at the temperature $T_2$. Substituting x=0 into the above equations results in $y_{01}=c_1$ and $y_{02}=c_2$, so there are five unknowns, x, $a_1$, $b_1$, $a_2$, and $b_2$. However, since $a_1$, $b_1$, $a_2$, $b_2$ are all functions of argon concentration z, when the functions $a_1=f_{a1}(z)$, $b_1=f_{b1}(z)$, $a_2=f_{a2}(z)$, and $b_2=f_{b2}(z)$ are each obtained in advance, solving simultaneous equations having two unknowns x and z makes it possible to obtain unknown oxygen concentration and argon concentration.

The inventors have found through studies that, in three-phase gas containing oxygen, nitrogen, and argon, $a_1$, $a_2$ are almost constant without depending on z, and $b_1$, $b_2$ can be linearly approximated with respect to z as represented by the following equations (5) and (6). That is,

[EQ. 5]

$$b_1 = h_1 z + j_1 \quad (5)$$

[EQ. 6]

$$b_2 = h_2 z + j_2 \quad (6)$$

substituting these equations into the above-described equations (3) and (4) related to $y_1$, $y_2$ yields:

[EQ. 7]

$$x = \frac{-(h_2 j_1 - h_1 j_2) \pm \sqrt{(h_2 j_1 - h_1 j_2)^2 - 4(h_2 a_1 - h_1 a_2)\{h_2(c_1 - y_1) - h_1(c_2 - y_2)\}}}{2(h_2 a_1 - h_1 a_2)} \quad (7)$$

[EQ. 8]

$$z = \frac{a_1 x^2 + j_1 x + c_1 - y_1}{-h_1 x}; \quad (8)$$

therefore, when the thermal conductivity $y_1$ and thermal conductivity $y_2$ are obtained, the oxygen concentration x and the argon concentration z can be obtained from the equations (7) and (8), respectively.

As described above, it is possible to give, as the coefficients of the equations for calculating the mixture ratio of the mixture of gases from the thermal conductivity, the parameters stored in the second storage unit 32 and corresponding to the relationships between the thermal conductivity of the mixture of gases and oxygen concentration at two temperatures that are dependent on the argon concentration.

Further, the parameters stored in the second storage unit 32 may be curves representing, as schematically shown in FIG. 7, the relationships between the thermal conductivity of the mixture of gases and oxygen concentration at two temperatures that are dependent on the argon concentration. As described above, storing, in the second storage unit 32, the curves representing the relationships between the thermal conductivity of the mixture of gases and oxygen concentration at two temperatures that are dependent on the argon concentration allows the calculation of the ratio calculation to be simplified. Further, the use of a known curve makes it resistant to noise.

<Treatment of Mixture of Fluids Containing Four or More Kinds of Fluids>

In a first embodiment, as described above, as a basic embodiment of one or more aspects, the mixture ratio calculation device 2 that calculates the mixture ratio of a mixture of fluids containing three kinds of fluids has been described. The mixture ratio calculation device 2 capable of calculating the mixture ratio of a mixture of fluids containing four or more kinds of fluids will be described below. Treatment of the mixture of fluids containing four or more kinds of fluids is applicable to the following modifications and embodiments in the same manner. The structure of the mixture ratio calculation device 2 and the procedure of the mixture ratio calculation process are the same as according to a first embodiment, and no description will be given of the structure and the procedure.

A description will be given below with reference to a gas as an example of a fluid. LP gas is a mixture of gases containing propane and butane, and city gas is a mixture of gases containing methane and a small amount of ethane. When such mixtures of gases further contain hydrogen, the mixtures of gases become a mixture of gases containing five components in total, that is, five kinds of gases.

Figure 10:
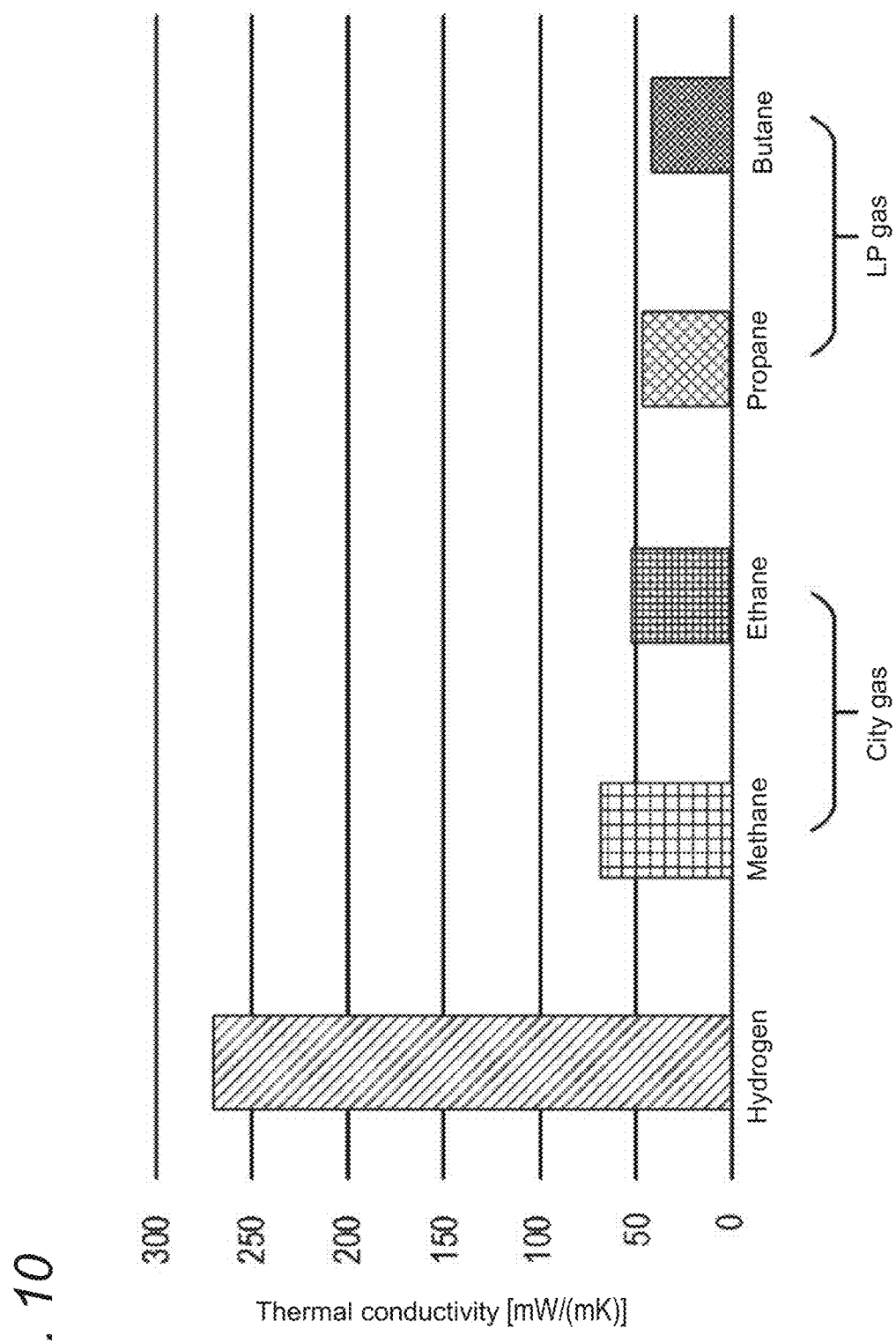
FIG. 10 is a graph showing components and thermal conductivity of the mixture of gases whose mixture ratio is calculated according to a first embodiment.

FIG. 10 shows components of fuel gases (LP gas and city gas) included in this mixture of gases and the thermal conductivity of hydrogen. This mixture of gases contains (i) hydrogen with high thermal conductivity, (ii) city gas with medium thermal conductivity, and (iii) LP gas with low thermal conductivity. That is, assuming that two or more kinds of gases identical or similar to each other in thermal conductivity are regarded as one component gas in a pseudo manner on the basis of the thermal conductivity, the mixture of gases containing five kinds of gases can be regarded as a mixture of gases containing three kinds of gases. Assuming that two or more kinds of gases that can be treated as one component gas in a pseudo manner are defined as a pseudo-component gas, the city gas containing two components of methane and ethane serves as one kind of pseudo-component gas, and the LP gas containing two components of propane and butane also serves as one kind of pseudo-component gas.

This allows the mixture ratio calculation device 2 to calculate the mixture ratio (concentration) of hydrogen with the mixture of gases containing five kinds of gases treated as the mixture of gases containing three kinds of gases. This further allows the mixture ratio calculation device 2 to calculate the mixture ratios of the city gas and the LP gas serving as the pseudo-component gases to discriminate between the city gas and the LP gas.

The above-described method for causing the mixture ratio calculation device 2 to calculate the mixture ratio with the mixture of gases containing of four or more kinds of gases treated as the mixture of gases containing three kinds of gases is applied to not only a case where the pseudo-component gas contains two or more kinds of gases identical or similar to each other in thermal conductivity but other cases. For example, two or more kinds of gases identical or similar to each other in mixture ratio (component ratio) can be mixed together to compose a pseudo-component gas. Further, even when the mixture ratios (component ratios) are different from each other, two or more kinds of gases identical or similar to each other in thermal property value such as a thermal conductivity can be mixed together to compose a pseudo-component gas. Further, a gas whose mixture ratio (component ratio) is less than a predetermined value is negligible for the mixture ratio calculation process unless a thermal property value such as a thermal conductivity is extremely different. The predetermined value used in determination of the magnitude of the mixture ratio may be set as desired.

Modification

Next, a modification of a first embodiment will be described. The same components as in a first embodiment will be denoted by the same reference numerals, and thus no description will be given of the components. A detection element according to the modification is the same in structure as the detection element 100 according to a first embodiment. According to the modification, the heating heater 116 is caused to generate heat only when the concentration of the mixture of gases is detected. This prevents the heating heater 116 from being unnecessarily heated and thus allows a reduction in power consumption. Further, since the heating heater 116 does not unnecessarily generate heat, the lifetime of the heating heater 116 can be increased. The control of the heating heater 116 according to the modification is applicable to heating heaters according to second to fourth embodiments to be described later.

Another Modification

Figure 11:
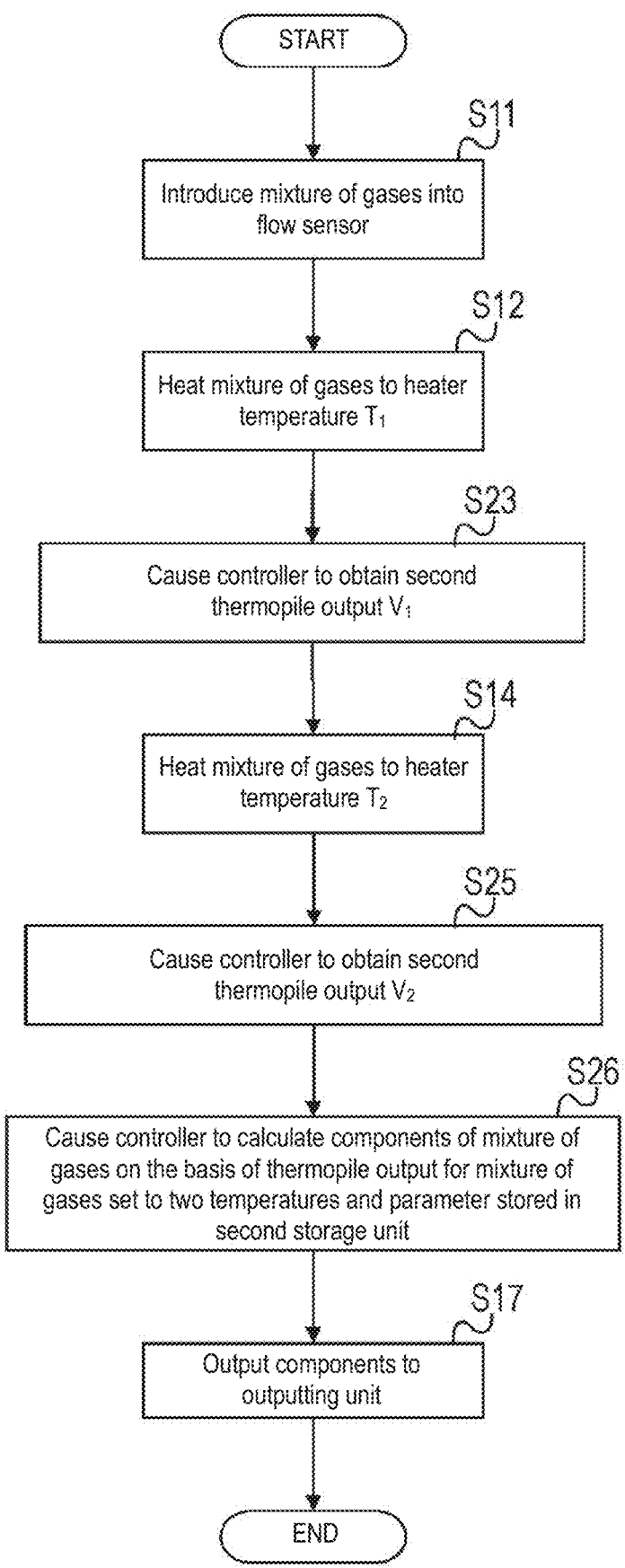
FIG. 11 is a flowchart showing a procedure of a mixture ratio calculation process according to a modification of a first embodiment.

Next, another modification of a first embodiment will be described. The same components as in a first embodiment will be denoted by the same reference numerals, and thus no description will be given of the components. A mixture ratio calculation process according to the modification will be described with reference to the flowchart of FIG. 11. According to a first embodiment, the thermal conductivity of the mixture of gases is calculated from the output value from the second thermopile 112 and the parameter stored in the first storage unit 31. According to the modification, the mixture ratio of the mixture of gases is calculated from the output from the second thermopile 112 without reference to the thermal conductivity. In this case, the mixture ratio calculation device 2 need not include the first storage unit 31 that stores the parameter for use in calculation of the thermal conductivity of the mixture of gases from the output value from the second thermopile 112.

Steps S11 and S12 are the same as in a first embodiment. Next, according to the modification, the mixture ratio calculator 22 obtains a second thermopile output $V_1$ (step S23). The following step S14 is the same as in a first embodiment. Next, the mixture ratio calculator 22 obtains a second thermopile output $V_2$ (step S25). Then, the mixture ratio calculator 22 calculates the mixture ratio of the mixture of gases on the basis of the second thermopile output for the mixture of gases at two temperatures and parameters stored in the second storage unit 32 (step S26). Here, the second storage unit 32 stores parameters unique to the second thermopile 112, such as coefficients for use in conversion of the output value from the second thermopile 112 for the mixture of gases at two different temperatures into the mixture ratio of the mixture of gases. Then, as in a first embodiment, the mixture ratio of the mixture of gases is output to the outputting unit 5 (step S17).

This eliminates the need of providing the first storage unit 31 and only requires that the second storage unit 32 store the parameters such as coefficients for use in conversion of the output value from the second thermopile 112 for the mixture of gases at two different temperatures into the mixture ratio of the mixture of gases, so that the capacity of the storage device can be reduced.

Second Embodiment

Next, a second embodiment will be described. The same components as in a first embodiment will be denoted by the same reference numerals, and thus no description will be given of the components. A detection element according to an embodiment is the same in structure as the detection element 100 according to a first embodiment. According to a first embodiment, the heating heater 116 is provided separately from the detection-use micro-heater 110 of the detection element 100, but according to an embodiment, the detection-use micro-heater 110 serves as the heating heater. That is, the detection-use micro-heater 110 for heating the gas to be measured for flow rate detection is also used for heating the gas to be measured for calculation of the mixture ratio.

This allows the structure of the detection element to be simplified and thus allows reductions in cost and size. Further, heating for setting the gas to different temperatures and heating for detection are performed by the same heater, which allows a reduction in power consumption.

Third Embodiment

Figure 12:
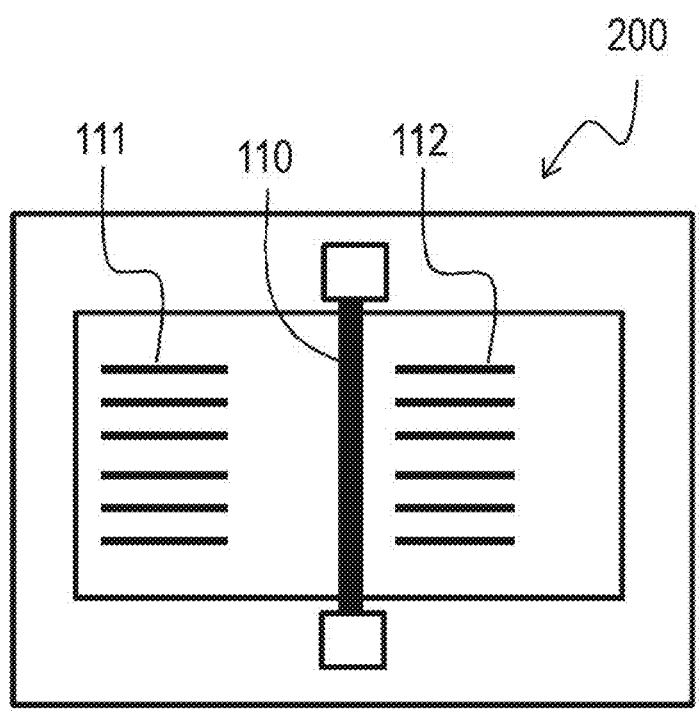
FIG. 12 is a plan view showing a detection element of a mixture ratio calculation device according to a third embodiment.

Next, a third embodiment will be described. The same components as in the first and second embodiments are denoted by the same reference numerals, and thus no description will be given of the components. According to a third embodiment, as in a second embodiment, the detection-use micro-heater 110 also serves as the heating micro-heater. According to an embodiment, the arrangement of the first thermopile 111 and the second thermopile 112 relative to the detection-use micro-heater 110 is changed from the above-described modification. FIG. 12 is a plan view schematically showing a structure of a detection element 200 according to an embodiment. According to an embodiment, the first thermopile 111 and the second thermopile 112 are arranged at positions different in distance from the detection-use m icro-heater 110. Specifically, the first thermopile 111 and the second thermopile 112 are arranged such that the distance between the first thermopile 111 and the detection-use micro-heater 110 is greater than the distance between the second thermopile 112 and the detection-use micro-heater 110. That is, the second thermopile 112 is disposed in a high temperature region adjacent to the detection-use micro-heater 110, and the first thermopile 111 is disposed in a low temperature region away from the detection-use micro-heater 110. Accordingly, utilizing heat distribution of the detection element 200 allows data at two temperatures to be obtained from first thermopile 111 and the second thermopile 112. According to an embodiment, the first thermopile 111 corresponds to a "first temperature difference detector" according to one or more aspects, and the second thermopile 112 corresponds to a "second temperature difference detector" according to one or more aspects.

This allows data at two temperatures to be obtained at the same time and thus increases responsiveness and accuracy. Further, since it is not necessary to switch temperatures of the detection-use micro-heater that also serves as the heating micro-heater, the control becomes simple. Since the detection-use micro-heater 110 also serves as the heating micro-heater, the structure of the flow sensor can be simplified, thereby allowing reductions in cost and size. Further, heating for setting the gas to different temperatures and heating for detection are performed by the same heater, which allows a reduction in power consumption.

Fourth Embodiment

Figure 13:
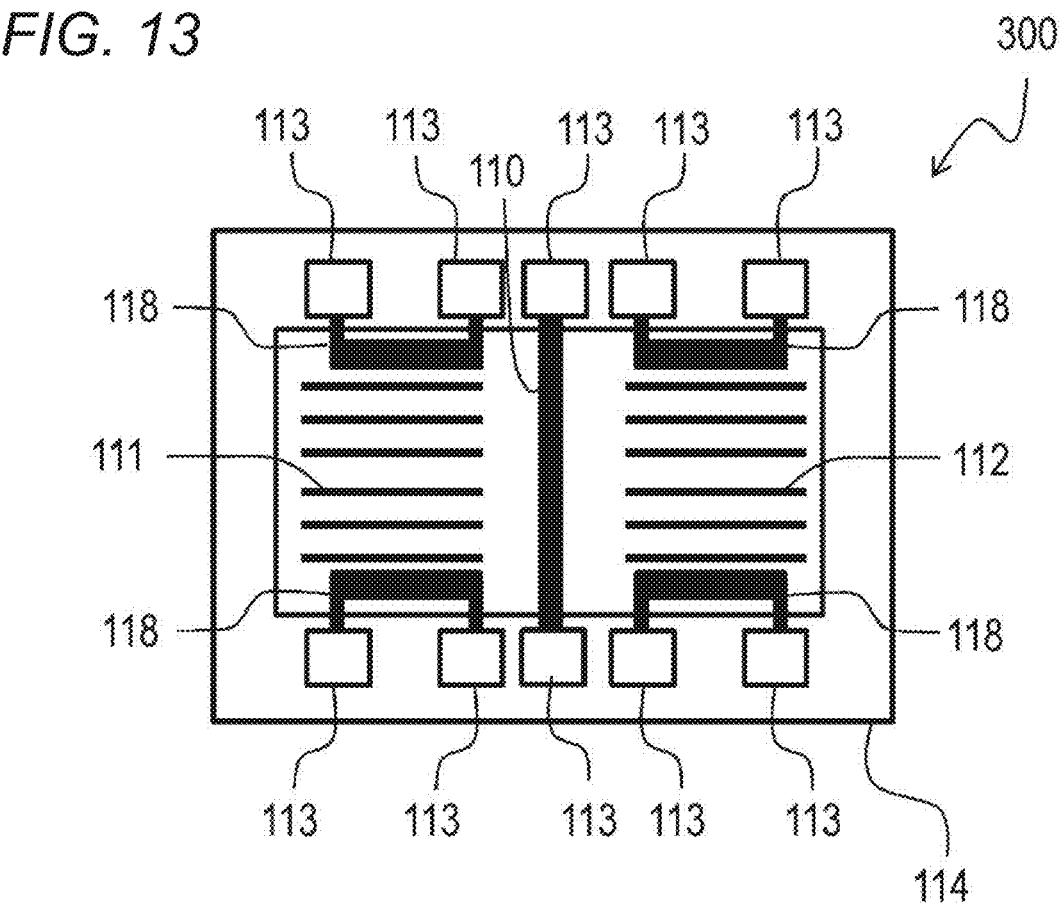
FIG. 13 is a plan view showing a detection element of a mixture ratio calculation device according to a fourth embodiment.
Figure 14:
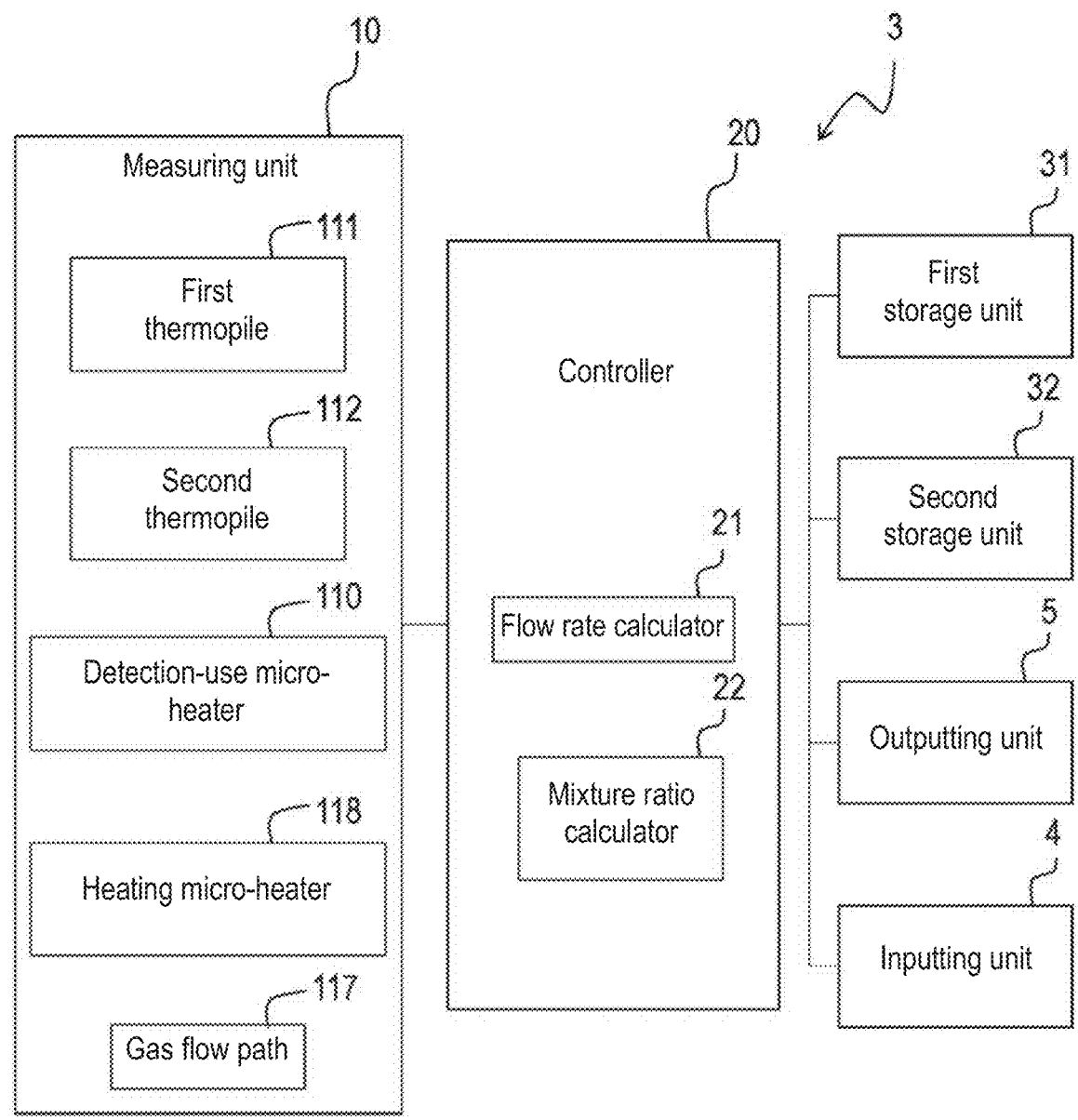
FIG. 14 is a functional block diagram of the mixture ratio calculation device according to a fourth embodiment.

In a detection element 300 according to an embodiment, a heating micro-heater is provided on the same MEMS chip together with a detection-use heater. FIG. 13 is a plan view schematically showing a structure of the detection element 300 according to an embodiment. FIG. 14 is a functional block diagram of a mixture ratio calculation device 3 according to an embodiment. The same components as in a first embodiment will be denoted by the same reference numerals, and thus no description will be given of the components. As shown in FIG. 13, according to an embodiment, the detection-use micro-heater 110, a heating micro-heater 118, the first thermopile 111, and the second thermopile 112 are provided on the same chip. That is, according to an embodiment, the heating micro-heater 118 is formed on the MEMS chip by the same process as applied to the detection-use micro-heater. As shown in FIG. 14, the measuring unit 10 in the mixture ratio calculation device 3 according to an embodiment includes the first thermopile 111, the second thermopile 112, the detection-use micro-heater 110, the heating micro-heater 118, and the gas flow path 117.

The detection-use micro-heater 110 is, for example, a resistor made of polysilicon, and is provided along the center of the detection element. Similarly, the heating micro-heater 118 may be a resistor made of polysilicon. The heating micro-heaters 118, 118 are arranged such that the detection-use micro-heater 110 is sandwiched between the heating micro-heaters 118, 118. Further, the heating micro-heaters 118, 118 are arranged on both sides of the first thermopile 111 such that the first thermopile 111 is sandwiched between the heating micro-heaters 118, 118. The heating micro-heaters 118, 118 are arranged on both sides of the second thermopile 112 such that the second thermopile 112 is sandwiched between the heating micro-heaters 118, 118. Further, the first thermopile 111 and the second thermopile 112 are provided on both sides of the detection-use micro-heater 110 such that the detection-use micro-heater 110 is sandwiched between the first thermopile 111 and the second thermopile 112. An insulation thin film is formed all over upper surfaces (on the front side of FIG. 12) of the detection-use micro-heater 110, the heating micro-heater 118, the first thermopile 111, and the second thermopile 112, but is not shown in FIG. 12. The detection element further includes electrode pads 113 . . . 113 and a circuit board 114. As in a first embodiment, a cavity is provided in the circuit board 114 below the first thermopile 111 and the second thermopile 112 (on the back side of FIG. 12). Here, a gas to be measured is forced to flow parallel to FIG. 12 over the upper surface of the detection element. The detection element is disposed such that the first thermopile is located upstream in the gas flow direction, the second thermopile is located downstream in the gas flow direction, and the heating micro-heaters 118, 118, 118, 118 are located upstream and downstream in the gas flow direction.

This allows the detection-use micro-heater 110 and the heating micro-heater 118 to be formed by the same process and at the same time and thus allows a reduction in manufacturing cost. Further, since the heating micro-heater 118 is formed on the MEMS chip, it is possible to reduce the size. Further, since the heat generated by the heating micro-heater 118 is applied only to a minimum necessary area that is the vicinity of the first thermopile 111 and second thermopile 112, it is possible to reduce power consumption.

According to a first embodiment, the mixture ratio of the mixture of gases is calculated on the basis of the output value from the second thermopile 112, but may be calculated on the basis of the output value from the first thermopile 111 or an average calculated from the output value from the first thermopile 111 and the output value from the second thermopile 112.

Fifth Embodiment

Figure 15:
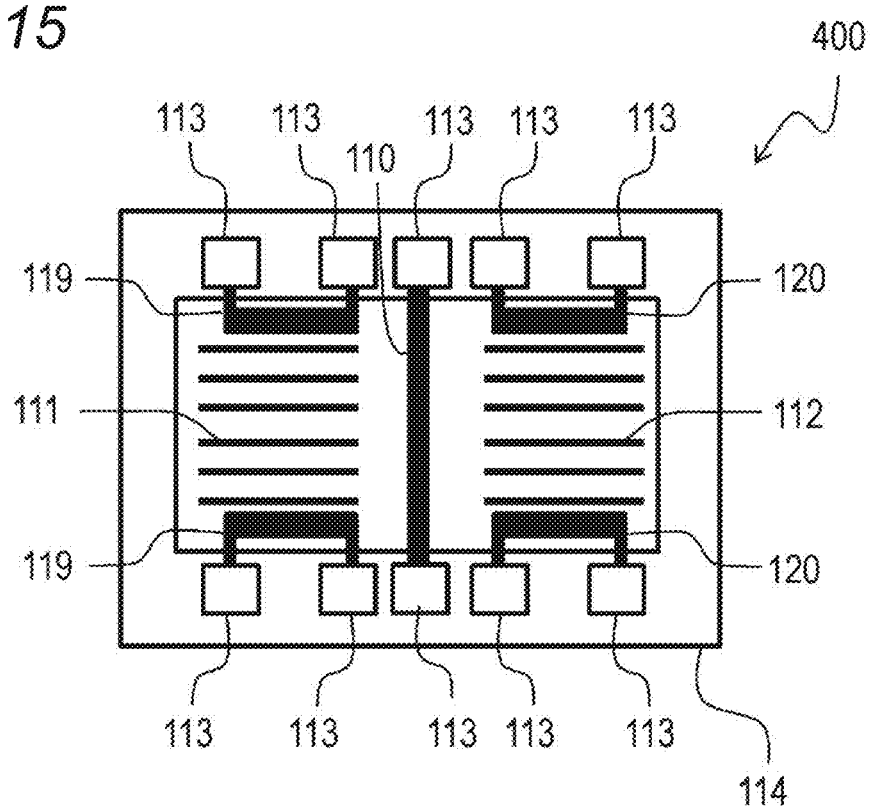
FIG. 15 is a plan view of a detection element of a mixture ratio calculation device according to a fifth embodiment.

A detection element 400 according to a fifth embodiment will be described. The same components as in a fourth embodiment will be denoted by the same reference numerals, and thus no description will be given of the components. FIG. 15 is a plan view schematically showing a structure of the detection element 400 according to an embodiment. According to an embodiment, first heating micro-heaters 119, 119 and the second heating micro-heaters 120, 120 are formed on the MEMS chip. Here, the first heating micro-heaters 119, 119 arranged on the upstream side and the second heating micro-heaters 120, 120 arranged on the downstream side are caused to generate heat having different temperatures, that is, a temperature $T_1$ and a temperature $T_2$, respectively, so that thermal conductivity at the temperature $T_1$ and thermal conductivity at the temperature $T_2$ are obtained at the same time. Here, the first heating micro-heaters 119, 119 each correspond to a "first temperature heater" according to one or more aspects, and the second heating micro-heaters 120, 120 each correspond to a "second temperature heater" according to one or more aspects.

This allows data at two temperatures to be obtained at the same time and thus increases responsiveness, and eliminates the need of switching temperatures of the heating micro-heater and thus allows the control to be simplified.

Sixth Embodiment

Figure 16:
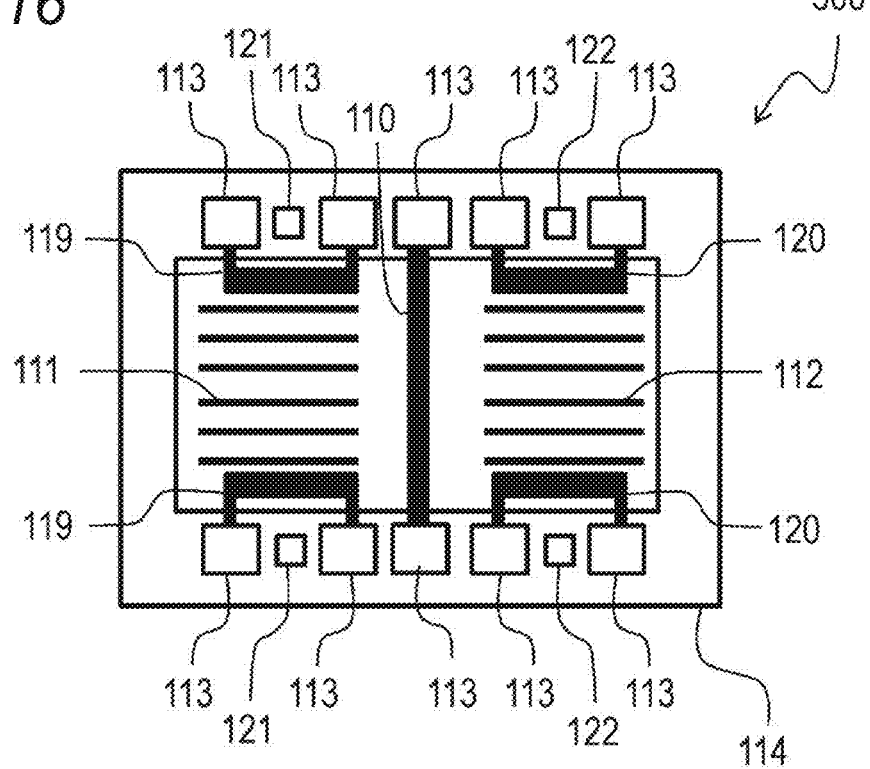
FIG. 16 is a plan view of a detection element of a mixture ratio calculation device according to a sixth embodiment.

According to an embodiment, temperature sensors 121, 122 that measure the temperature of the gas to be measured are provided, and temperatures of heat generated by the heating micro-heaters 119, 120 are controlled in accordance with outputs from the temperature sensors 121, 122. The same components as in a third embodiment will be denoted by the same reference numerals, and thus no description will be given of the components. FIG. 16 is a plan view schematically showing a structure of a detection element 500 according to an embodiment. The temperature sensors 121, 122 are arranged on a board 114 between electrode pads 113, 113 of each of the heating micro-heaters 119, 120. That is, the temperature sensors 121, 121 are arranged between the electrode pads 113, 113 connected to the first heating micro-heaters 119, 119, and the temperature sensors 122, 122 are arranged between the electrode pads 113, 113 connected to the second heating micro-heaters 120, 120. Here, the temperature sensors 121, 122 each correspond to a "temperature detector" according to the invention.

This allows the first heating micro-heater 119 and the second heating micro-heater 120 to be controlled on the basis of the temperatures detected by the temperature sensors 121, 122 and thus allows a reduction in power consumption without unnecessary heating. Further, since the first heating micro-heater 119 and the second heating micro-heater 120 can be controlled on the basis of the temperatures detected by the temperature sensors 121, 122, it is possible to increase the lifetime of the first heating micro-heater 119 and the lifetime of the second heating micro-heater 120 without unnecessary heating. Further, since the temperature sensors 121, 122 are arranged on the MEMS chip, and thus the sensor ambient temperature is made constant, the measured value is not affected by a change in environmental temperature, which eliminates the need of cost of temperature calibration.

Here, the temperature sensors 121, 122 are provided for the detection element including the first heating micro-heaters 119, 119 and the second heating micro-heaters 120, 120 that generate heat having different temperatures as in a third embodiment, or alternatively, a temperature sensor may be provided in a configuration where the heating micro-heaters 118, 118, 118, 118 generate heat having the same temperature as in a second embodiment.

Seventh Embodiment

Figure 17:
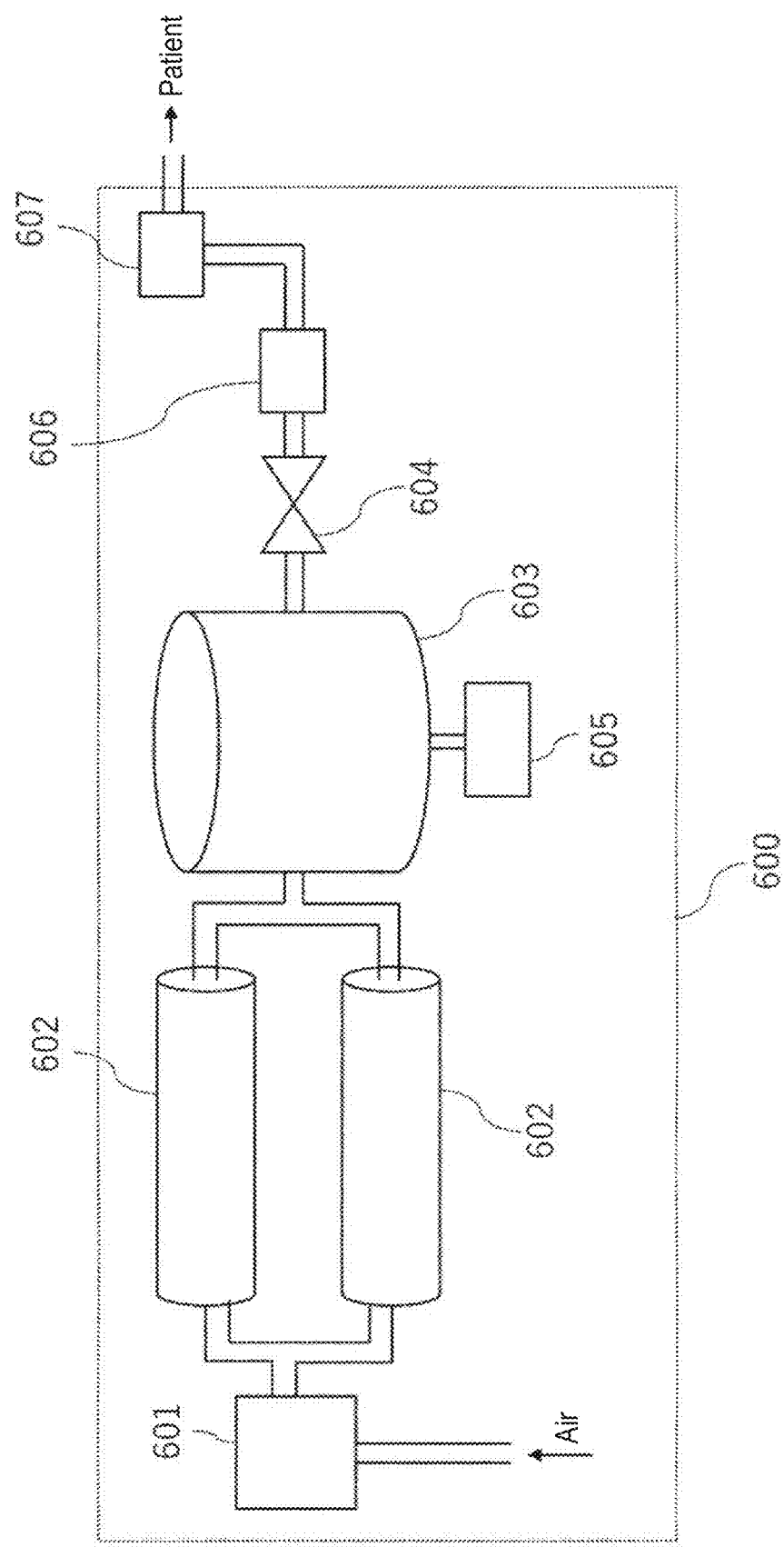
FIG. 17 is a schematic structure diagram of an oxygen concentrator according to a seventh embodiment.

The embodiment corresponds to an oxygen concentrator including a mixture ratio calculation device. FIG. 17 is a diagram schematically showing a structure of an oxygen concentrator 600 according to an embodiment. The oxygen concentrator 600 is used by, for example, a patient suffering from a respiratory disease. The oxygen concentrator 600 includes, for example, a compressor 601 that compresses air taken in from the outside of the system, and a sieve bed 602 that pressurizes or depressurizes the air compressed by the compressor 601 to generate high-concentration oxygen. The oxygen concentrator 600 further includes an oxygen tank 603 that stores the high-concentration oxygen thus generated, and a flow rate control solenoid valve 604 that controls a flow rate of a mixture of gases containing the high-concentration oxygen fed from the oxygen tank 603 to the patient. The oxygen tank 603 is provided with a pressure gauge 605 that detects pressure in the oxygen tank. Further, disposed downstream of the flow rate control solenoid valve 604 is a concentration detection device 606 that detects an argon concentration of the mixture of gases supplied via the flow rate control solenoid valve 604. Provided downstream of the concentration detection device 606 is a pressure gauge 607. The pressure gauge 607 detects the pressure of the mixture of gases supplied to the patient. For example, when the patient suffering from a respiratory disease inhales oxygen from the oxygen concentrator 600, it is possible to determine whether the patient is breathing normally or determine the intensity of inhalation of the patient or the like.

Figures 18A, 18B, 18C:
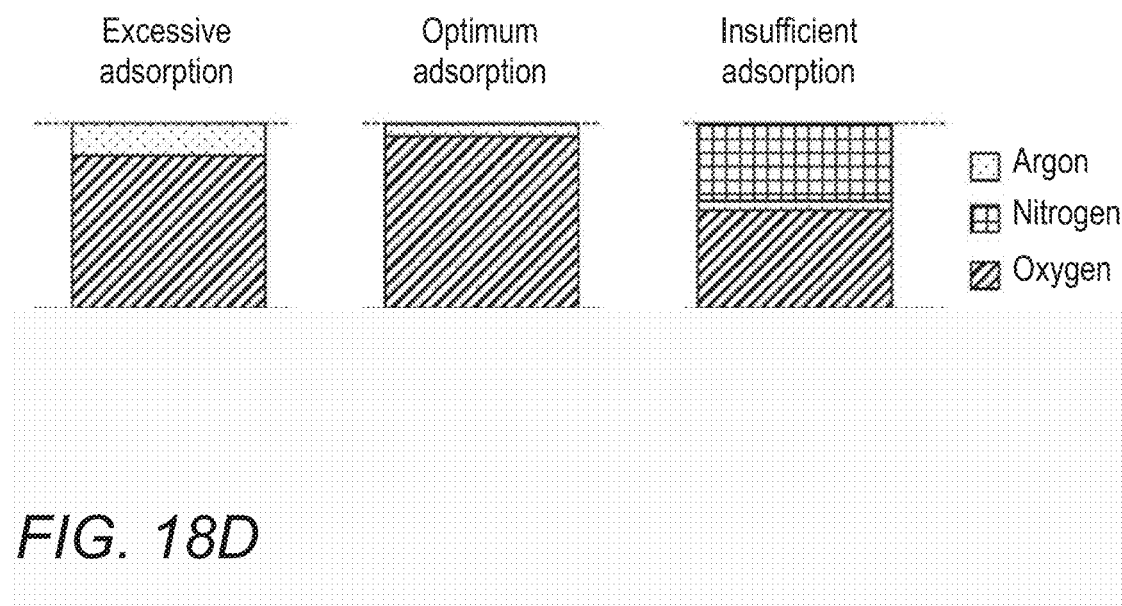
FIGS. 18A to 18D are diagrams showing how adsorption is made in the oxygen concentrator according to a seventh embodiment.

It can be assumed that the air compressed by the compressor 601 is a mixture of gases containing three components of nitrogen, oxygen, and argon. In the sieve bed 602, to which the compressed air is supplied, nitrogen is adsorbed from the air to concentrate oxygen. The degree of ease of adsorption in the sieve bed 602 is in the order of nitrogen, oxygen, and argon. Therefore, a component ratio of the mixture of gases supplied from the sieve bed 602 to the oxygen tank 603 varies in a manner that depends on whether the adsorption is suitably applied by the sieve bed 602, that is, the pressure is suitably applied by the compressor 601. FIGS. 18A, 18B, and 18C show examples of the component ratio of the mixture of gases in cases of excessive adsorption, optimum adsorption, and insufficient adsorption, respectively. In FIGS. 18A, 18B, and 18C, a portion represented by grid lines represents the component ratio of nitrogen, a portion represented by diagonal lines represents the component ratio of oxygen, and a portion represented by dots represents the component ratio of argon. When the pressure applied by the compressor is low to make adsorption insufficient, nitrogen that has not been adsorbed remains in the mixture of gases supplied from the sieve bed to the oxygen tank (see FIG. 18C). In such a state where nitrogen has not been suitably adsorbed, neither oxygen nor argon is adsorbed, so that the ratio of argon to oxygen is 4.45%, which is equal to the ratio to normal air. When the adsorption is optimally applied by the sieve bed 602, nitrogen is suitably adsorbed, and nitrogen remaining in the mixture of gases supplied from the sieve bed to the oxygen tank is negligible (see FIG. 18B). At this time, oxygen is not adsorbed by the sieve bed, and thus the ratio of argon to oxygen is also 4.45%. However, when the pressure applied by the compressor is high to make adsorption excessive, not only nitrogen but also oxygen is adsorbed by the sieve bed (see FIG. 18A). At this time, in the mixture of gases supplied from the sieve bed to the oxygen tank, oxygen is reduced relative to argon, so that the ratio of argon to oxygen is increased to be equal to or greater than 4.45%.

As described above, the concentration detection device 606 can detect the argon concentration or oxygen concentration in the mixture of gases supplied to determine whether the adsorption is suitably applied by the sieve bed 602, so that it is possible to supply the patient with oxygen in a suitable concentration by controlling the compressor 601 on the basis of the detection result from the concentration detection device 606.

Figure 18D:
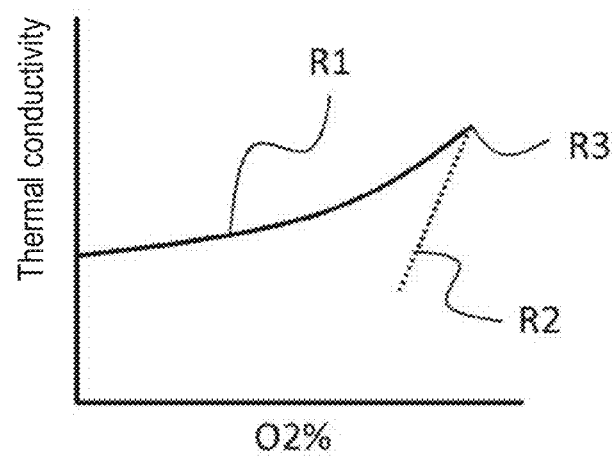

A description will be given below of detection of oxygen concentration in the concentration detection device 606, that is, calculation of the mixture ratio. As described above, since the composition of the mixture of gases is different between the case of insufficient adsorption and the case of excessive adsorption, it is assumed that a relationship between the oxygen concentration and the thermal conductivity of the mixture of gases in the case of insufficient adsorption is different from a relationship between the oxygen concentration and the thermal conductivity of the mixture of gases in the case of excessive adsorption. For example, it is assumed that the oxygen concentration and the thermal conductivity have a relationship as shown in FIG. 18D. In FIG. 18D, a curve R1 representing the relationship between the oxygen concentration and the thermal conductivity of the mixture of gases in the case of insufficient adsorption is represented by a solid line, and a curve R2 representing the relationship between the oxygen concentration and the thermal conductivity of the mixture of gases in the case of excessive adsorption is represented by a dotted line. At this time, an intersection point R3 of the curve R1 and the curve R2 represents the state of optimum adsorption.

When it is shown that the oxygen concentration and the thermal conductivity of the mixture of gases have one of the relationships represented by such different curves, it is possible to determine whether the adsorption applied by the sieve bed is insufficient or excessive. The relationships between the oxygen concentration and the thermal conductivity of the mixture of gases in the state of insufficient adsorption, the state of optimal adsorption, and the state of excessive adsorption are obtained in advance. The relationships between the oxygen concentration and the thermal conductivity of the mixture of gases represented by the curves may be stored in the second storage unit 32, or alternatively, coefficients of approximate expressions representing the relationships between the oxygen concentration and the thermal conductivity of the mixture of gases may be stored in the second storage unit 32.

Figure 19:
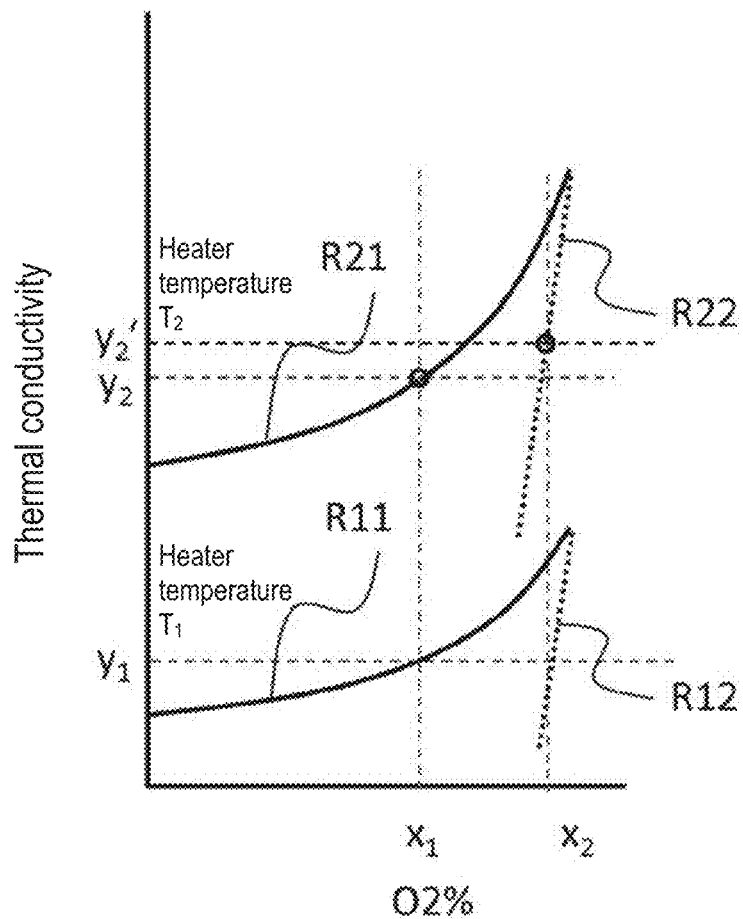
FIG. 19 is a graph showing a relationship between thermal conductivity of a mixture of gases and oxygen concentration according to a seventh embodiment.

FIG. 19 shows relationships R11, R12 between the oxygen concentration and the thermal conductivity of the mixture of gases when the temperature of the heating heater is $T_1$, and relationships R21, R22 between the oxygen concentration and the thermal conductivity of the mixture of gases when the temperature of the heating heater is $T_2$. Here, a curve R11 represented by a solid line represents a relationship between the oxygen concentration and the thermal conductivity of the mixture of gases (containing nitrogen, oxygen, and argon) in a state where the temperature of the heating heater is $T_1$ and adsorption is insufficient. A curve R12 represented by a dotted line represents a relationship between the oxygen concentration and the thermal conductivity of the mixture of gases (containing oxygen and argon) in a state where the temperature of the heating heater is $T_1$ and adsorption is excessive. Further, a curve R21 represented by a solid line represents a relationship between the oxygen concentration and the thermal conductivity of the mixture of gases (containing nitrogen, oxygen, and argon) in a state where the temperature of the heating heater is $T_2$ and adsorption is insufficient. A curve R22 represented by a dotted line represents a relationship between the oxygen concentration and the thermal conductivity of the mixture of gases (containing oxygen and argon) in a state where the temperature of the heating heater is $T_2$ and adsorption is excessive.

When, with the temperature of the heating heater being $T_1$, $y_1$ is obtained as a value of the thermal conductivity of the gas to be measured, and the relationship between the thermal conductivity of the mixture of gases and the oxygen concentration coincides with the relationship represented by the curve R11, the oxygen concentration becomes $x_1$. When the relationship between the thermal conductivity of the mixture of gases and the oxygen concentration coincides with the relationship represented by the curve R12, the oxygen concentration becomes $x_2$.

Next, when, with the temperature of the heating heater being $T_2$, $y_2$ is obtained as a value of the thermal conductivity of the gas to be measured, it is shown that the relationship between the thermal conductivity of the mixture of gases and the oxygen concentration is represented by the curves R11 and R21. Therefore, the gas to be measured is the mixture of gases containing nitrogen, oxygen, and argon, and $x_1$ at which the thermal conductivity is $y_1$ in the curve R11 is the oxygen concentration at this time. When $y_2'$ is obtained as the value of the thermal conductivity of the gas to be measured when the temperature of the heating heater is $T_2$, it is shown that the relationship between the thermal conductivity of the mixture of gases and the oxygen concentration is represented by the curves R12 and R22. Therefore, the gas to be measured is the mixture of gases of oxygen and argon, and $x_2$ at which the thermal conductivity is $y_2$ in the curve R12 is the oxygen concentration at this time. Further, when it is shown that the relationship between the thermal conductivity and the oxygen concentration is represented by either of the curves R11 and R12 (curves R21 and R22), the concentration of argon relative to oxygen is determined, and the argon concentration is also determined together with the oxygen concentration accordingly.

As described above, controlling the concentration pressure applied by the compressor 601 so as to optimize the nitrogen adsorption amount on the basis of the detection result of the argon concentration or the oxygen concentration from the concentration detection device 606 in the oxygen concentrator 600 makes it possible to eliminate ineffective operation of the compressor 601 and thus allows a reduction in power consumption. Further, controlling the concentration pressure applied by the compressor 601 so as to optimize the nitrogen adsorption amount on the basis of the detection result of the argon concentration or the oxygen concentration from the concentration detection device 606 in the oxygen concentrator 600 makes it possible to eliminate ineffective adsorption in the sieve bed 602 and thus allows an increase in lifetime of a filter of the sieve bed 602.

Eighth Embodiment

Next, a mixture ratio calculation device according to an eighth embodiment will be described. The same components as in a first embodiment are denoted by the same reference numerals, and thus no description will be given of the components. The structure excluding the measuring unit 10 and the mixture ratio calculation process are the same as in the above-described embodiments, and thus no description will be given of the structure and the mixture ratio calculation process. According to each of the above-described embodiments, the component ratio of the mixture of gases is calculated through measurement of the thermal conductivity and the like at two different temperatures using the thermal conductivity or the output from the thermopile as the thermal property of the mixture of gases. According to an embodiment, attention is paid to sound velocity as the thermal property of the mixture of gases, and sound velocities in the mixture of gases at two different temperatures are measured.

Figure 20:
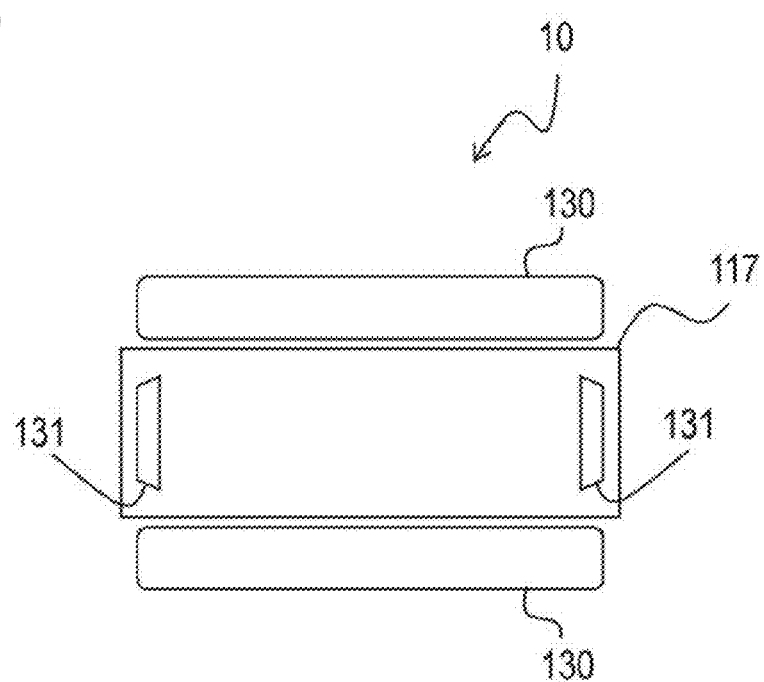
FIG. 20 is a diagram schematically showing a structure of a measuring unit of a mixture ratio calculation device according to an eighth embodiment.

FIG. 20 schematically shows a structure of a measuring unit 10 according to an embodiment. Here, the measuring unit 10 includes, in a gas flow path 17 through which the mixture of gases flows, a heating heater 130 that heats the mixture of gases. The measuring unit 10 further includes an ultrasonic sensor 131 that measures the velocity (sound velocity) of an ultrasonic wave propagating in the mixture of gases. According to an embodiment, the heating heater 130 corresponds to a "first heat generator" according to one or more aspects. Further, according to an embodiment, the ultrasonic sensor 131 corresponds to a "basic information detector" according to one or more aspects. The ultrasonic sensor 131 is disposed relative to the gas flow path 17 so as to detect a change in sound velocity in the mixture of gases flowing through the gas flow path 17. For example, the ultrasonic sensor 131 may include an ultrasonic wave emitter and an ultrasonic wave receiver arranged with the gas flow path 17 interposed between the ultrasonic wave emitter and the ultrasonic wave receiver, and is capable of detecting the velocity of sound in the mixture of gases on the basis of a time elapsed between emission of the ultrasonic wave from the ultrasonic wave emitter and reception of the ultrasonic wave by the ultrasonic wave receiver and the distance between the ultrasonic wave emitter and the ultrasonic wave receiver.

A relationship between the component ratio of the mixture of gases and the sound velocity at each temperature is obtained in advance, it is specified, from two sound velocities measured at two different temperatures, to which of the component ratios a relationship between the component ratio and the sound velocity to be satisfied by the mixture of gases corresponds, and then the component ratio with respect to the sound velocity measured under the specified relationship is calculated.

This further makes it possible to calculate the mixture ratio of a mixture of gases containing gases having small differences in thermal conductivity even when there is a difference in sound velocity.

Ninth Embodiment

Next, a mixture ratio calculation device according to a ninth embodiment will be described. The same components as in a first embodiment are denoted by the same reference numerals, and thus no description will be given of the components. The structure excluding the measuring unit 10 and the mixture ratio calculation process are the same as in the above-described embodiments, and thus no description will be given of the structure and the mixture ratio calculation process. In each of the above-described embodiments, the mixture ratio is calculated for the mixture of gases, but the basic principle of one or more aspects are applicable to not only gas but also liquid. According to an embodiment, the mixture ratio of a mixture of liquids containing three components is calculated as in the case of the mixture of gases. Here, the thermal conductivity may be used as a property that varies in a manner that depends on a temperature of a fluid contained in the mixture of liquids, or alternatively, electrical conductivity or permittivity may be used for liquid.

Figure 21:
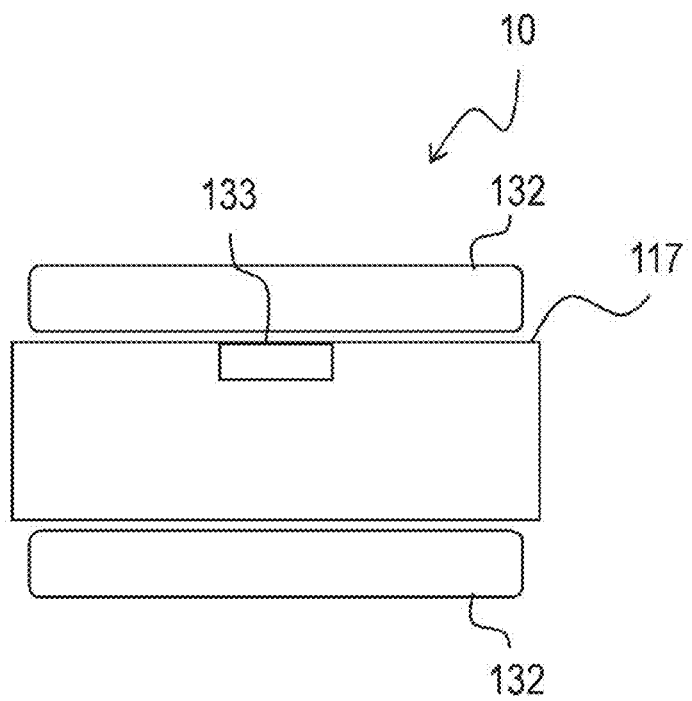
FIG. 21 is a diagram schematically showing a structure of a measuring unit of a mixture ratio calculation device according to a ninth embodiment.

FIG. 21 schematically shows a structure of a measuring unit 10 according to an embodiment. Here, the measuring unit 10 includes, in a flow path 117 through which the mixture of liquids flows, a detection-use heater 132 that also serves as a heating heater that heats the mixture of liquids. The measuring unit 10 further includes a sensor 133 that detects the thermal conductivity, electrical conductivity, or permittivity of the mixture of liquids. According to an embodiment, the detection-use heater 132 corresponds to a "first heat generator" and "second heat generator" according to one or more aspects. Further, the sensor 133 corresponds to a "temperature difference detector" according to one or more aspects.

A relationship between the component ratio and the thermal conductivity, electrical conductivity, or permittivity of the mixture of liquids at each temperature is obtained in advance, it is specified, from two thermal conductivities, electrical conductivities, or permittivities detected at two different temperatures, to which of the component ratios a relationship between the component ratio and the thermal conductivity, electrical conductivity, or permittivity to be satisfied by the mixture of liquids corresponds, and then the component ratio with respect to the thermal conductivity, electrical conductivity, or permittivity detected under the specified relationship is calculated.

This further makes it possible to calculate the mixture ratio of the mixture of liquids.

Note that, in order to allow a comparison between the configuration requirement of one or more aspects and the configuration of one or more embodiments, the configuration requirement of one or more aspects will be described with the reference numerals used in the drawings.

<First Invention>

A mixture ratio calculation device (2, 3) configured to calculate a mixture ratio of a mixture of fluids containing three or more kinds of fluids includes a first heat generator (116, 118) configured to heat the mixture of fluids, a basic information detector configured to detect basic information on a predetermined thermal property value of the mixture of fluids, and a mixture ratio calculator (22) configured to calculate mixture ratios of the three or more kinds of fluids to the mixture of fluids.

The mixture ratio calculator (22) is configured to cause a second heat generator (110) to generate a temperature difference in the mixture of fluids, cause the first heat generator (116, 118) to heat the mixture of fluids to a first temperature, obtain the predetermined thermal property value of the mixture of fluids set to the first temperature on the basis of an output from the basic information detector (110, 111, 112) with respect to the mixture of fluids set to the first temperature, cause the first heat generator (116, 118) to heat the mixture of fluids to a second temperature different from the first temperature, obtain the thermal property value of the mixture of fluids set to the second temperature on the basis of an output from the basic information detector (110, 111, 112) with respect to the mixture of fluids set to the second temperature, obtain first relationship information that defines a relationship between the thermal property value of the mixture of fluids set to the first temperature and a mixture ratio, to the mixture of fluids, of a first fluid contained in the mixture of fluids, obtain second relationship information that defines a relationship between the thermal property value of the mixture of fluids set to the second temperature and a mixture ratio of the first fluid to the mixture of fluids, and calculate the mixture ratios of the three or more kinds of fluids to the mixture of fluids on the basis of the thermal property value of the mixture of fluids set to the first temperature, the thermal property value of the mixture of fluids set to the second temperature, the first relationship information, and the second relationship information.

What is claimed is:

1. A mixture ratio calculation device configured to calculate a mixture ratio of a mixture of fluids containing three or more kinds of fluids, the mixture ratio calculation device comprising:
   a first heat generator configured to heat the mixture of fluids;
   a basic information detector configured to detect basic information on a thermal property value of the mixture of fluids, the thermal property value being predetermined; and
   a mixture ratio calculator configured to calculate mixture ratios of the three or more kinds of fluids to the mixture of fluids, wherein
   the mixture ratio calculator is configured to:
   cause the first heat generator to set the mixture of fluids to a first temperature;
   obtain the thermal property value of the mixture of fluids set to the first temperature on a basis of a detection result for the mixture of fluids set to the first temperature from the basic information detector;
   cause the first heat generator to set the mixture of fluids to a second temperature different from the first temperature;
   obtain the thermal property value of the mixture of fluids set to the second temperature on a basis of a detection result for the mixture of fluids set to the second temperature from the basic information detector;
   obtain first relationship information that defines a relationship between the thermal property value of the mixture of fluids set to the first temperature and a mixture ratio of a first fluid contained in the mixture of fluids with respect to the mixture of fluids;
   obtain second relationship information that defines a relationship between the thermal property value of the mixture of fluids set to the second temperature and a mixture ratio of the first fluid to the mixture of fluids; and
   calculate the mixture ratios of the three or more kinds of fluids to the mixture of fluids on a basis of the thermal property value of the mixture of fluids set to the first temperature, the thermal property value of the mixture of fluids set to the second temperature, the first relationship information, and the second relationship information.

2. The mixture ratio calculation device according to claim 1, wherein the mixture of fluids comprises three kinds of the fluids.

3. The mixture ratio calculation device according to claim 1, wherein the thermal property value is any one of thermal conductivity, electrical conductivity, permittivity, or sound velocity.

4. The mixture ratio calculation device according to claim 1, wherein the fluids are gas or liquid.

5. The mixture ratio calculation device according to claim 1, wherein an argon concentration is calculated as a mixture ratio of a mixture of gases having oxygen concentrated from a mixture of gases containing oxygen, nitrogen, and argon.

6. The mixture ratio calculation device according to claim 1, wherein
   the first relationship information is a coefficient of a relational expression that defines the relationship between the thermal property value of the mixture of fluids set to the first temperature and the mixture ratio of the first fluid to the mixture of fluids, and
   the second relationship information is a coefficient of a relational expression that defines the relationship between the thermal property value of the mixture of fluids set to the second temperature and the mixture ratio of the first fluid to the mixture of fluids.

7. The mixture ratio calculation device according to claim 1, wherein
   the first relationship information is a curve that associates the thermal property value of the mixture of fluids set to the first temperature with the mixture ratio of the first fluid to the mixture of fluids, and
   the second relationship information is a curve that associates the thermal property value of the mixture of fluids set to the second temperature with the mixture ratio of the first fluid to the mixture of fluids.

8. The mixture ratio calculation device according to claim 1, wherein the first heat generator is caused to generate heat when the mixture ratio of the mixture of fluids is calculated.

9. The mixture ratio calculation device according to claim 1, wherein
   the mixture of fluids comprises four or more kinds of the fluids and comprises two or more kinds of the fluids composing a pseudo-component fluid whose mixture ratio can be calculated as a mixture ratio of one kind of fluid in a pseudo manner, and
   the mixture of fluids comprises three kinds of fluids comprising the fluids and the pseudo-component fluid.

10. The mixture ratio calculation device according to claim 9, wherein the pseudo-component fluid comprises two or more kinds of the fluids that are identical or similar to each other in their thermal property value.

11. The mixture ratio calculation device according to claim 9, wherein the pseudo-component fluid comprises two or more kinds of the fluids that are identical or similar to each other in their mixture ratio to the mixture of fluids.

12. The mixture ratio calculation device according to claim 9, wherein four or more kinds of the fluids comprise a fluid whose mixture ratio to the mixture of fluids is equal to or less than a predetermined value and that is excluded from fluids whose mixture ratios are calculated.

13. The mixture ratio calculation device according to claim 1, wherein the basic information detector comprises:
- a temperature difference detector configured to output a signal corresponding to a temperature difference generated in the mixture of fluids; and
- a second heat generator configured to generate the temperature difference in the mixture of fluids, and the mixture ratio calculator is configured to:
- cause the second heat generator to generate the temperature difference in the mixture of fluids;
- obtain the thermal property value of the mixture of fluids set to the first temperature on a basis of an output, from the temperature difference detector, with respect to the mixture of fluids set to the first temperature by the first heat generator; and
- obtain the thermal property value of the mixture of fluids set to the second temperature on a basis of an output, from the temperature difference detector, with respect to the mixture of fluids set to the second temperature by the first heat generator.

14. The mixture ratio calculation device according to claim 13, wherein the mixture ratio calculator is configured to:
- obtain conversion information for use in conversion of the output from the temperature difference detector into the thermal property value of the mixture of fluids;
- convert the output from the temperature difference detector into the thermal property value of the mixture of fluids set to the first temperature on a basis of the conversion information; and
- convert the output from the temperature difference detector into the thermal property value of the mixture of fluids set to the second temperature on the basis of the conversion information.

15. The mixture ratio calculation device according to claim 13, wherein the mixture ratio calculator is configured to:
- use, as the thermal property value of the mixture of fluids set to the first temperature, the output from the temperature difference detector with respect to the mixture of fluids set to the first temperature; and
- use, as the thermal property value of the mixture of fluids set to the second temperature, the output from the temperature difference detector with respect to the mixture of fluids set to the second temperature.

16. The mixture ratio calculation device according to claim 13, wherein the first heat generator, the second heat generator, and the temperature difference detector are formed on a same chip.

17. The mixture ratio calculation device according to claim 16, wherein the first heat generator comprises a first temperature heater configured to set the mixture of fluids to the first temperature and a second temperature heater configured to set the mixture of fluids to the second temperature.

18. The mixture ratio calculation device according to claim 16, wherein the second heat generator has a function of the first heat generator.

19. The mixture ratio calculation device according to claim 18, wherein the temperature difference detector comprises a first temperature difference detector and a second temperature difference detector arranged at positions different in distance from the second heat generator.

20. The mixture ratio calculation device according to claim 18, further comprising a temperature detector configured to detect the temperature of the mixture of fluids.

* * * * *